(12) United States Patent
Sporrer et al.

(10) Patent No.: US 12,144,278 B2
(45) Date of Patent: Nov. 19, 2024

(54) RESIDUE MONITORING AND RESIDUE-BASED CONTROL

(71) Applicant: Deere & Company, Moline, IL (US)

(72) Inventors: Adam D. Sporrer, Huxley, IA (US); Ricky B. Theilen, Bettendorf, IA (US); Lucas B. Larsen, Ankeny, IA (US); Kyle J. Trost, Frankfort, IL (US)

(*) Notice: Subject to any disclaimer, the term of this patent is extended or adjusted under 35 U.S.C. 154(b) by 0 days.

(21) Appl. No.: 18/187,388

(22) Filed: Mar. 21, 2023

(65) Prior Publication Data
US 2023/0329139 A1 Oct. 19, 2023

Related U.S. Application Data

(63) Continuation of application No. 16/401,678, filed on May 2, 2019, now Pat. No. 11,632,895.

(51) Int. Cl.
*A01B 79/00* (2006.01)
*A01B 49/02* (2006.01)
(Continued)

(52) U.S. Cl.
CPC ............ *A01B 79/005* (2013.01); *A01B 63/32* (2013.01); *G06T 7/0002* (2013.01); *H04N 23/54* (2023.01);
(Continued)

(58) Field of Classification Search
CPC ..... A01B 79/005; A01B 63/32; A01B 49/027; A01B 17/002; A01B 41/06;
(Continued)

(56) References Cited

U.S. PATENT DOCUMENTS 6,853,937 B2   2/2005   Shibusawa et al.
8,862,339 B2  10/2014   Henry et al.
(Continued)

FOREIGN PATENT DOCUMENTS

EP   2668469 A1   12/2013
EP   2936957 A1   10/2015
(Continued)

OTHER PUBLICATIONS

Extended European Search Report and Written Opinion issued in European Patent Application No. 20172757.5, dated Sep. 30, 2020, 7 pages.

*Primary Examiner* — Fernando Alcon
(74) *Attorney, Agent, or Firm* — Kelly, Holt & Christenson; Joseph R. Kelly

(57) ABSTRACT

An agricultural machine includes a set of ground engaging elements that perform a ground engaging operation. The agricultural machine includes a rearward sensor mounted to the agricultural machine to sense an area of ground behind the agricultural machine and generate a rearward sensor signal. The agricultural machine includes rearward zone generator logic that determines a first zone and a second zone, wherein the first zone and the second zone represent portions of the area of ground behind the agricultural machine. The agricultural machine includes rearward residue generator logic configured to receive the rearward sensor signal and determine a first residue metric indicative of the amount of residue in the first zone. The agricultural machine includes control logic that controls one or more aspects of the ground engaging operation on the area of ground based on the first residue metric.

20 Claims, 13 Drawing Sheets

(51) Int. Cl.
*A01B 63/32* (2006.01)
*G06T 7/00* (2017.01)
*H04N 23/54* (2023.01)
*H04N 23/90* (2023.01)

(52) U.S. Cl.
CPC ............ *H04N 23/90* (2023.01); *A01B 49/027* (2013.01); *G06T 2207/30188* (2013.01)

(58) Field of Classification Search
CPC ... A01B 63/1112; A01B 33/16; G06T 7/0002; G06T 2207/30188; H04N 5/2253; H04N 5/247; H04N 7/181
See application file for complete search history.

(56) References Cited

U.S. PATENT DOCUMENTS

| | | | |
|---|---|---|---|
| 9,282,688 | B2 | 3/2016 | Casper et al. |
| 9,516,802 | B2 | 12/2016 | Zemenchik |
| 9,554,098 | B2 | 1/2017 | Casper et al. |
| 10,255,670 | B1* | 4/2019 | Wu ........................ H04N 7/183 |
| 11,632,895 | B2 | 4/2023 | Sporrer et al. |
| 2016/0029547 | A1 | 2/2016 | Casper et al. |
| 2016/0078391 | A1 | 3/2016 | Blank et al. |
| 2017/0112043 | A1 | 4/2017 | Nair et al. |
| 2018/0210450 | A1 | 7/2018 | Ferrari et al. |
| 2018/0220577 | A1 | 8/2018 | Posselius et al. |
| 2019/0150357 | A1* | 5/2019 | Wu ........................ H04N 7/188 |
| 2019/0354081 | A1 | 11/2019 | Blank et al. |
| 2020/0128719 | A1 | 4/2020 | Harmon |
| 2020/0329652 | A1 | 10/2020 | McElhaney et al. |
| 2020/0344939 | A1 | 11/2020 | Sporrer et al. |
| 2021/0015039 | A1 | 1/2021 | Vandike et al. |
| 2021/0029890 | A1 | 2/2021 | Kurihara et al. |
| 2021/0034867 | A1* | 2/2021 | Ferrari ........................ G06T 7/11 |
| 2021/0084820 | A1 | 3/2021 | Vandike et al. |
| 2021/0123728 | A1 | 4/2021 | Smith |
| 2021/0153420 | A1* | 5/2021 | Smith .................. A01B 79/005 |
| 2021/0183045 | A1 | 6/2021 | Iwasawa et al. |
| 2021/0272255 | A1* | 9/2021 | Barrick ................... G06T 7/001 |
| 2021/0283973 | A1 | 9/2021 | Birkland et al. |
| 2022/0022375 | A1 | 1/2022 | Murray et al. |
| 2022/0110241 | A1 | 4/2022 | Vandike et al. |
| 2022/0113734 | A1 | 4/2022 | Vandike et al. |
| 2022/0117158 | A1 | 4/2022 | Lamprecht |
| 2022/0132722 | A1 | 5/2022 | Bomleny et al. |
| 2022/0132829 | A1 | 5/2022 | Kwak et al. |
| 2022/0138925 | A1 | 5/2022 | Anderson et al. |
| 2023/0017658 | A1* | 1/2023 | Vandike ............... A01B 79/005 |
| 2023/0048528 | A1* | 2/2023 | Wieckhorst .......... A01B 79/005 |

FOREIGN PATENT DOCUMENTS

| | | |
|---|---|---|
| EP | 3167698 A1 | 5/2017 |
| WO | 2019001819 A1 | 1/2019 |

* cited by examiner

RESIDUE MONITORING AND RESIDUE-BASED CONTROL

CROSS-REFERENCE TO RELATED APPLICATION

The present application is a continuation of and claims priority of U.S. patent application Ser. No. 16/401,678, filed May 2, 2019, the content of which is hereby incorporated by reference in its entirety.

FIELD OF THE DESCRIPTION

This disclosure relates to agricultural machines. More specifically, this disclosure relates to monitoring residue and controlling operations involving residue.

BACKGROUND

Various agricultural or other operations may result in residue covering a portion of an area addressed by the operation. In an agricultural setting, for example, residue may include straw, corn stalks, or various other types of plant material, which may be either cut or un-cut, and either loose or attached to the ground to varying degrees. Agricultural residue may result, for example, from tillage operations, which may generally cut and bury plant material to varying degrees and, accordingly, may result in residue of various sizes covering the tilled ground to various degrees. Notably, the size and coverage of residue may vary from location to location even within a single field, depending on factors such as the local terrain and soil conditions of the field, local plant coverage, residue characteristics before the tillage (or other) operation, and so on. Residue coverage may generally be characterized by at least two factors: percent coverage (i.e., percentage of a given area of ground that is covered by residue) and residue size (i.e., a characteristic length, width or area of individual pieces of residue).

The discussion above is merely provided for general background information and is not intended to be used as an aid in determining the scope of the claimed subject matter.

SUMMARY

An agricultural machine includes a set of ground engaging elements that perform a ground engaging operation. The agricultural machine includes a rearward sensor mounted to the agricultural machine to sense an area of ground behind the agricultural machine and generate a rearward sensor signal. The agricultural machine includes rearward zone generator logic that determines a first zone and a second zone, wherein the first zone and the second zone represent portions of the area of ground behind the agricultural machine. The agricultural machine includes rearward residue generator logic configured to receive the rearward sensor signal and determine a first residue metric indicative of the amount of residue in the first zone. The agricultural machine includes control logic that controls one or more aspects of the ground engaging operation on the area of ground based on the first residue metric.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
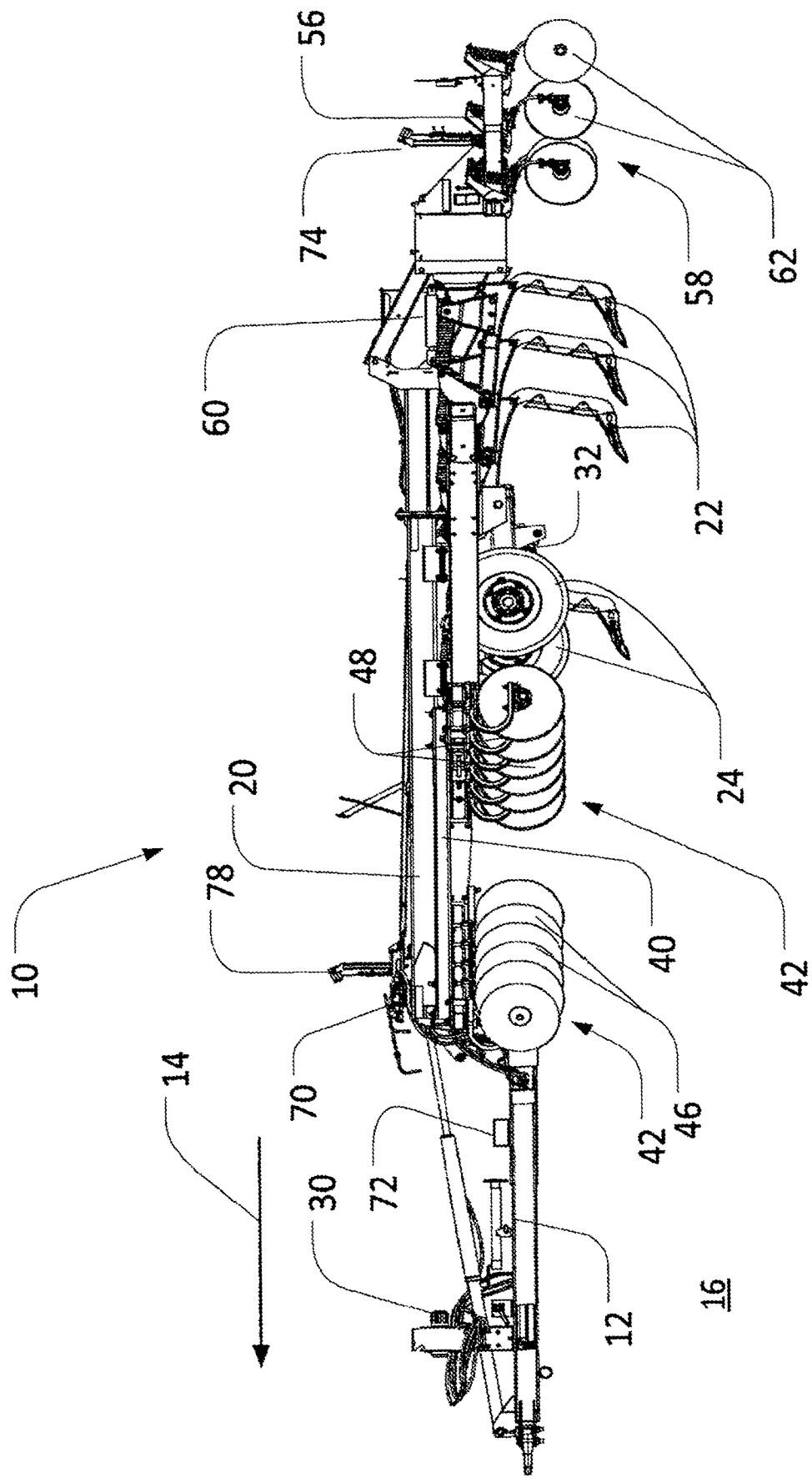
FIG. 1 is a side view showing an example tillage implement with a wheel assembly in a retracted orientation.

As noted above, various operations may result in residue on a field. For example, a primary tillage operation utilizing various rippers, cutting disks, and other tools may both cut and bury plant material along a field to varying degrees. Generally, after such an operation (and others), some amount of residue (i.e., cut and un-cut plant material) may be left on the field surface. Such residue may generally be characterized at least by a percent coverage (i.e., a percentage of a given area of ground that is covered by residue) and a characteristic residue size (i.e., an average, nominal, or other measurement of the length, width or area of particular pieces of residue).

In certain applications, it may be useful to understand the characteristics of residue coverage with relative accuracy. For example, certain regulatory standards addressing erosion and other issues may specify a target percent coverage for residue after a particular operation, such as a primary or secondary tillage operation, a planting operation, a spraying operation, and so on. In various instances, it may also be useful to understand the characteristic (e.g., average) size of residue over a given area of a field. In some cases, it may be useful to understand both percent coverage and residue size. For example, in order to execute an effective primary tillage operation, an operator may endeavor to leave at least 30% residue coverage, with no more than 10% of residue material being larger than 4 inches long.

In this light, it may be useful to provide a system and method for actively assessing aspects of residue coverage during a particular operation and utilizing this assessment to control ongoing aspects of the particular operation or a different, future operation. For example, for a primary tillage (or other) operation, it may be useful to provide a control system that determines the percent coverage and characteristic size of residue on a portion of field that has already been tilled (or otherwise addressed), then utilize the determined percent coverage and characteristic size to guide the continuing tillage (or other) operation or a future operation (e.g., a secondary tillage operation or planting operation) on the same field. For more specialized control of the tillage operation, the areas rearward and forward of the tillage implement can be divided into a plurality of different zones. Each zone can be independently monitored for percent coverage, characteristic size or other metrics. This way, variances of uniformity in residue coverage can be monitored and addressed.

Various discussions herein may specifically address tillage operations using tillage implements. It will be understood, however, that the system and method disclosed herein may be utilized for a variety of other operations and a variety of other implements.

In some examples, one or more camera assemblies may be provided for a tillage (or other) implement, which assemblies may be capable of capturing visible, infrared, or other images of a field on which the implement is operating. At least one camera may be mounted to the tillage implement so as to capture images of an area of ground immediately behind the tillage implement. At least one other camera may be mounted to the implement so as to capture images of an area of ground ahead of the tillage implement. (In this context, it will be understood that "ahead," "behind," and similar positional references may not necessarily indicate locations that are entirely forward or rearward of every component of the relevant implement. Rather, these references may indicate locations that are forward or rearward, relative to the normal travel direction of the implement, of the various tools or other components of the implement that may affect residue coverage on the field. For example, for a tillage implement with two front disk gangs, a central ripper assembly, and a back-closing disk assembly a camera capturing images of an area "ahead" of the implement may be viewed as capturing images of an area that is forward of the front-most disk gang. Likewise, a camera capturing images of an area "behind" the implement may be viewed as capturing images of an area that is rearward of the closing disk assembly.)

The various camera assemblies may capture images in the visible spectrum, in color or in grayscale, in infrared, based upon reflectance or fluorescence, or otherwise. In certain examples, one or more camera assemblies may include stereo image camera assemblies capable of capturing stereo images of the field. For example, one or more camera assemblies may include a stereo camera with two or more lenses and image sensors, or one or more camera assemblies may include multiple cameras arranged to capture stereoscopic images of the field. The camera assemblies can, of course, be replaced or used in conjunction with other types of sensors as well, for example, lidar, radar, ultrasonic systems, etc.

A computer system or device associated with the relevant implement may analyze the images of the field captured by the one or more camera assemblies in order to determine a metric of residue coverage on the field. For example, the computer system or device may analyze the images in order to determine an indicator of residue coverage, such as a percent coverage of residue in the imaged area of the field or a characteristic size (or size distribution) of residue in the imaged area of the field. An image may be analyzed in a variety of ways, including through edge-finding algorithms, color- or grayscale-gradient analysis, or other techniques.

Images from behind an implement (i.e., "rearward" images) may be analyzed, in order to determine metrics of residue coverage for areas of a field that have already been tilled (or otherwise addressed by the relevant operation). Theses areas can be further subdivided into zones which will have independent residue coverage metrics. The zones may then be compared with one another to monitor residue distribution or uniformity. Images from ahead of an implement (i.e., "forward" images) may also be analyzed, in order to determine metrics of residue coverage for areas of field that have not yet been tilled (or otherwise addressed) in the current pass of the implement. The forward images (or residue coverage information derived therefrom) may then be compared with rearward images of the same (or similar) areas of the field (or residue coverage information derived therefrom) in order to assess the change in residue coverage due to the operation performed by the implement. Forward areas may similarly be divided into zones and monitored for residue uniformity.

Once a residue coverage metric has been determined, the metric may be utilized to control aspects of a future operation over the field. For example, in an ongoing tillage operation, if residue metrics from a rearward image indicate insufficient residue coverage or size, various aspects of the tillage implement (e.g., disk or ripper depth) may be automatically adjusted in order to provide greater residue coverage or size. Similarly, if a comparison of residue metrics from forward and rearward images indicates that an ongoing tillage operation is decreasing residue coverage or size too aggressively, various aspects of the implement may be automatically adjusted accordingly. Additionally, if a comparison of residue metrics from lateral zones indicates that there is a lack of uniformity laterally across the rear of the implement, various aspects of the relevant implement may be automatically adjusted accordingly. For example, the angle of a disk gang may be adjusted to distribute residue from a highly concentrated zone to a lower concentrated zone to increase residue uniformity. Uniform residue coverage can be useful later for air seeders, planters, row cleaners, etc.

A residue coverage metric may be utilized to control aspects of a future operation that is distinct from the operation during which the metric was determined. For example, residue coverage metrics from a primary tillage operation may be associated with location readings from a global positioning system ("GPS") device in order to construct a map of residue coverage over various areas of a field. During a later secondary tillage operation, these location-specific residue coverage metrics may then be utilized in order to appropriately control the secondary tillage implement. For example, if residue coverage metrics from the primary tillage operation indicate excessive residue coverage over a portion of a field, during a secondary tillage operation various tools on a secondary tillage implement may be automatically controlled to more aggressively till that portion of the field. Likewise, location-specific reside coverage metrics from a first pass of a primary tillage (or other) operation may be used to automatically control aspects of tillage (or other) tools on a subsequent pass of the operation or of a different operation.

The computer system or device may be included on the relevant implement (e.g., as part of an embedded control system). In certain examples, the computer system or device may be included on another platform (e.g., a tractor towing the implement or a remote ground-station) and may communicate with various devices on the implement (e.g., various control devices) via various known means. In one example, the computer system or device may be in communication with a controller area network (CAN) bus associated with the implement or an associated vehicle, in order to send and receive relevant control and data signals.

As noted above, the system and method described herein may be implemented with respect to a variety of implements, including various agricultural or other work implements. In certain examples, the described system and method may be implemented with respect to a primary tillage implement. Referring, for example, to FIGS. 1-6, an example primary tillage implement is depicted as mulcher-ripper implement 10.

As depicted, implement 10 includes a coupling mechanism 12 for coupling the implement 10 to a vehicle (not shown). This may allow implement 10 to be towed across a field 16 in forward direction 14 in order to execute a tillage operation. It will be understood that other examples may include self-driven implements that may execute various operations without being towed by a separate vehicle.

Figure 2:
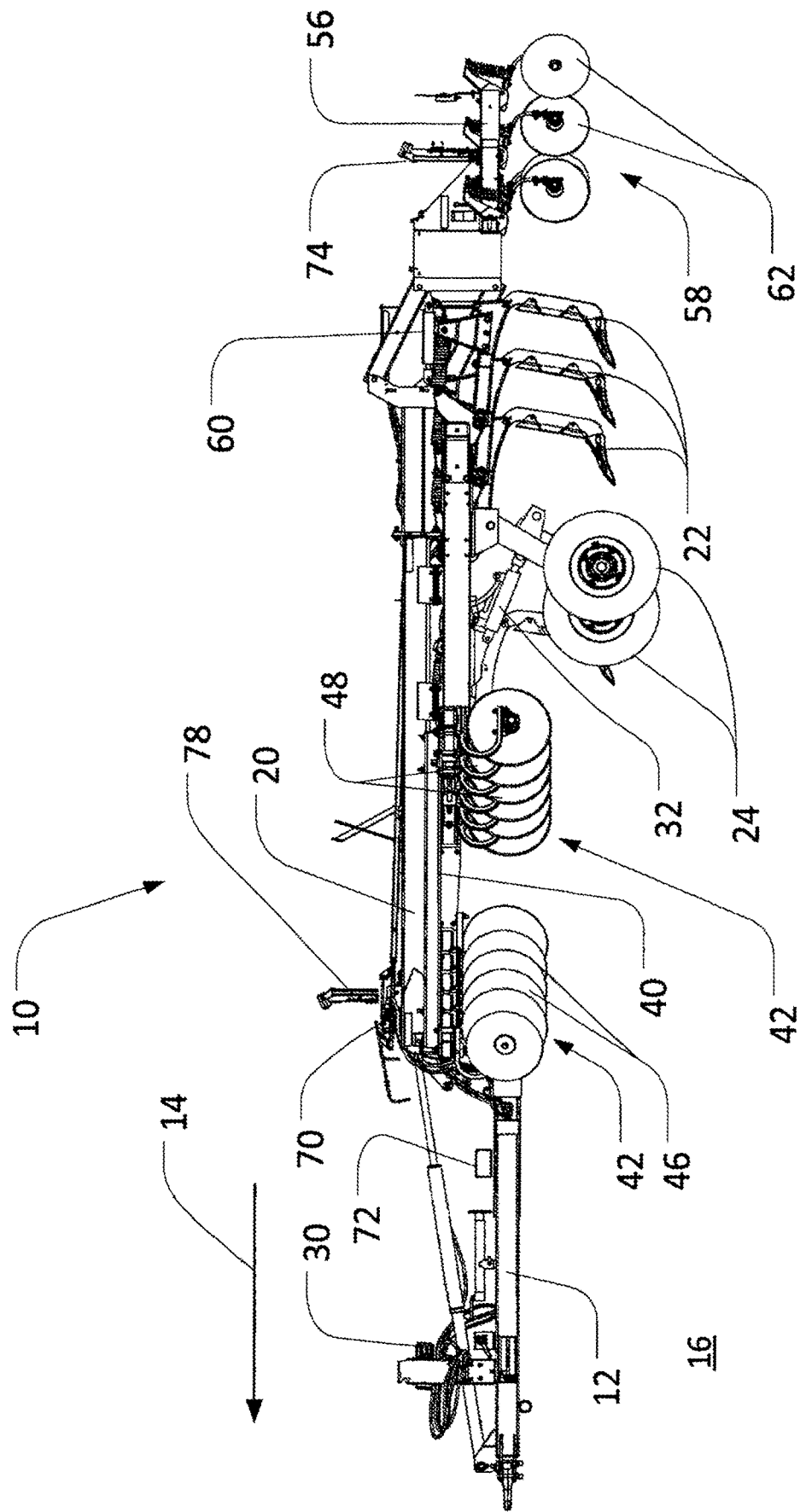
FIG. 2 is another side view of the example tillage implement of FIG. 1, with the wheel assembly in an extended orientation.
Figure 3:
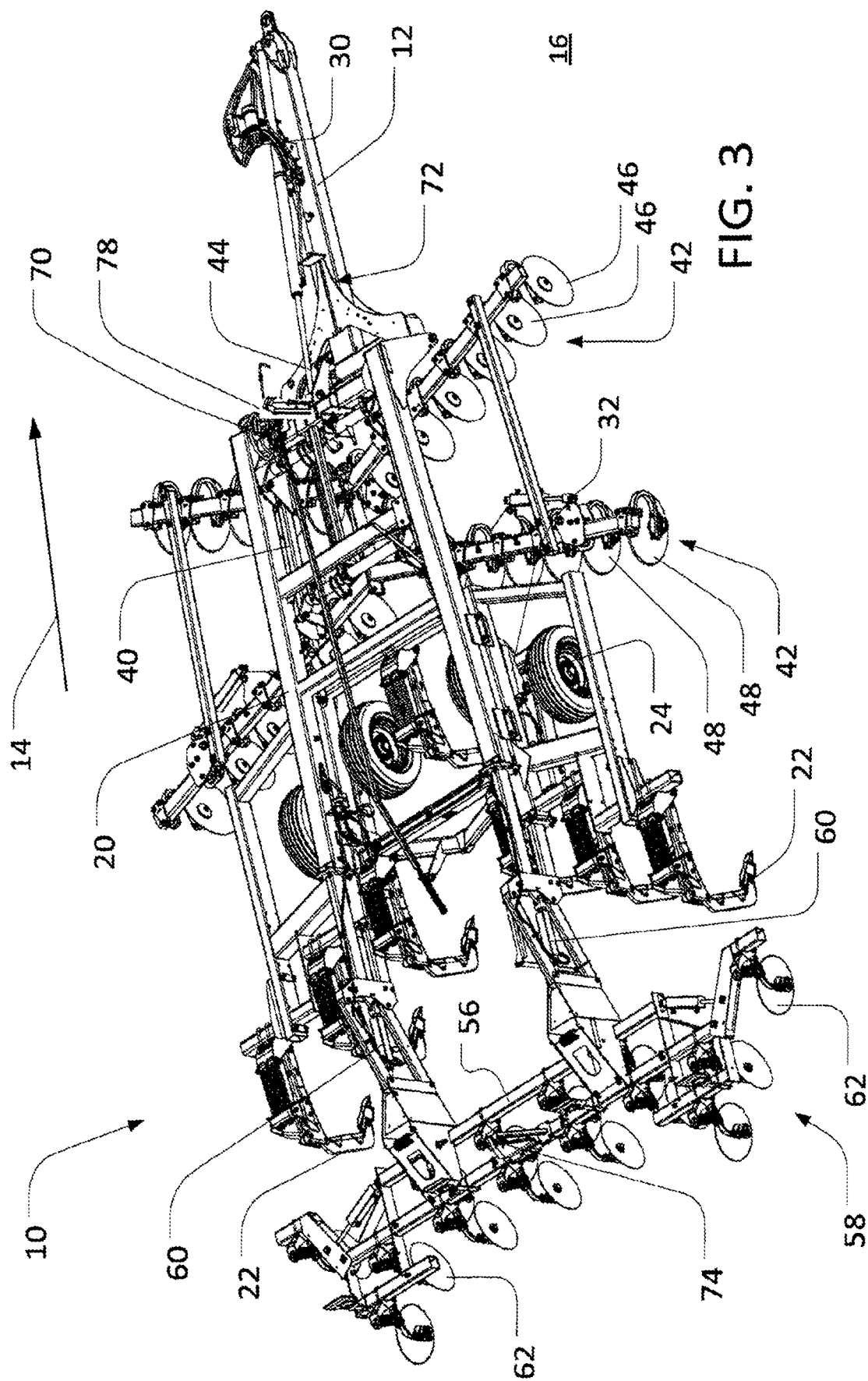
FIG. 3 is a perspective view of the example tillage implement of FIG. 1, with the wheel assembly in the retracted orientation.

Implement 10 may further include a first frame section 20, which may be connected to the coupling mechanism 12 and generally extend in a rearward direction away from the coupling mechanism 12. A first set of ground-engaging tools may be coupled to the first frame section 20. As depicted in FIGS. 1-3, for example, a set of shanks 22 may be coupled to the first frame section 20. It will be understood, however, that other tools may additionally (or alternatively) be utilized. In certain examples a plurality of wheel assemblies 24 may also be coupled to the first frame section 20, in order to support the first frame section 20 above the field 16.

The implement 10 may include (or may be in communication with) one or more controllers, which may include various electrical, computerized, electro-hydraulic, or other controllers. For example, an electrohydraulic controller 30 may be mounted to the coupling mechanism 12. The controller 30 may include various processors (not shown) coupled with various memory architectures (not shown), as well as one or more electrohydraulic valves (not shown) to control the flow of hydraulic control signals to various devices included on the implement 10. In some examples, the controller 30 may be in communication with a CAN bus associated with the implement 10 (or the towing vehicle (not shown)).

One or more hydraulic cylinders 32 (or other lift devices) may be coupled to the first frame section 20 and to the wheel assemblies 24. The cylinders 32 may be controlled by valves in hydraulic (or other) communication with the controller 30, such that the controller 30 may signal valves to control the cylinders 32 to rotate wheel assemblies 24 relative to frame 20 to raise or lower the first frame section 20 relative to the field 16 in order to move the various shanks 22 to various orientations between a preliminary position or travel position (e.g., FIG. 2) and a particular operating depth (FIG. 1). In one example, activation of the hydraulic cylinders 32 by the controller 30 may result in the shanks 22 being moved over a range of sixteen inches or more (e.g., between the orientations depicted in FIGS. 1 and 2). Such movement of the shanks 22 relative to the field 16 may be useful with regard to residue management. For example, deeper penetration of the shanks 22 into the field 16 may tend to bury more plant matter and therefore result in smaller percentage coverage of residue.

It will be understood that other configurations may also be possible. For example, the hydraulic cylinders 32 (or another lift device) may be coupled directly to the shanks 22 (or associated support components) rather than the wheel assemblies 24, in order to directly move the shanks 22 relative to frame 20.

Implement 10 may also include a second frame section 40, which may be pivotally coupled to the first frame section 20 (e.g., at one or more pivot points forward of the shanks 22). In certain examples, a second set of ground-engaging tools may be coupled to the second frame section 40. As depicted in FIGS. 1-3 and 4B, for example, a set of disk gang assemblies 42 may be coupled to the second frame section 40. It will be understood, however, that other tools may additionally (or alternatively) be utilized.

The disks 46 of the forward disk gang assembly 42 may be angled generally outward and the disks 48 of the rearward disk gang assembly 42 may be angled generally inward. In this way, the disks 46 may generally auger soil and plant matter (including residue) outward away from the centerline of implement 10, and the disks 48 may generally auger soil and plant matter (including residue) inward toward the centerline of implement 10. It will be understood, however, that other configurations may be possible, including configurations with differently angled disks 46 or 48, configurations with a different number or arrangement of disk gang assemblies 42, and so on.

One or more hydraulic cylinders 44 (or other lift devices) may be coupled to the first frame section 20 and to the second frame section 40. The cylinders 44 may be in hydraulic (or other) communication with valves that are controlled by the controller 30, such that the controller 30 may signal the cylinders 44 to pivot the second frame section 40 relative to the first frame section 20 in order to move the disk gang assemblies 42 relative to the first frame section 20. In this way, controller 30 may adjust the down-pressure of the disk gang assemblies 42 on the field 16 as well as the penetration depth of the disks of the assemblies 42 into the field 16. In one example, activation of the hydraulic cylinders 44 by the controller 30 may result in the disk gang assemblies 42 being moved over a range of eight inches or more. Such movement of the disk gang assemblies 42 relative to the field 16 may be useful with regard to residue management. For example, deeper penetration of the disks 46 and 48 into the field 16 may tend to bury more plant matter and therefore result in smaller percentage coverage of residue. Similarly, greater down-pressure of the disks 46 and 48 on the field 16 may result in a greater amount of plant material being cut by the disks 46 and 48 and, accordingly, in a generally smaller characteristic residue size.

It will be understood that other configurations may also be possible. For example, in certain examples, the hydraulic cylinders 44 (or another lift device) may be coupled directly to the disk gang assemblies 42 (or associated support components) rather than the second frame section 40, in order to directly move the disk gang assemblies 42 relative to the field 16.

Implement 10 may also include a third frame section 56, which may be pivotally coupled to the first frame section 20 (e.g., at one or more pivot points rearward of the shanks 22). A third set of ground-engaging tools may be coupled to the third frame section 56. As shown in FIGS. 1-3 and 4A, for example, a closing disk assembly 58 may be coupled to the third frame section 56. It will be understood, however, that other tools may additionally (or alternatively) be utilized.

One or more hydraulic cylinders 60 (or other lift devices) may be coupled to the first frame section 20 and the third frame section 56. The cylinders 60 may be in hydraulic (or other) communication with the controller 30, such that the controller 30 may signal the cylinders 60 to pivot the third frame section 56 relative to the first frame section 20 in order to move the closing assembly 58 relative to the first frame section 20. In this way, controller 30 may adjust the depth of the disks 62 of the assembly 58 relative to the field 16. In certain examples, activation of the hydraulic cylinders 60 by the controller 30 may result in the disks 62 being moved over a range of eight inches or more. Such movement of the disks 62 may also be useful with regard to residue management.

It will be understood that other configurations may also be possible. For instance, in certain examples, the hydraulic cylinders 60 (or another lift device) may be coupled directly to the closing disk assembly 58 (or associated support components) rather than the third frame section 56, in order to directly move the closing disk assembly 58 relative to the field 16.

Various other control devices and systems may be included on (or otherwise associated with implement 10. For example, a depth control device 70 may be mounted to the first frame section 20 and may be in hydraulic, electronic or other communication with controller 30, and cylinders 32, 44, and 60. The depth control device 70 may include various sensors (e.g., rotational sensors, potentiometers, pressure transducers, hall-effect rotational sensors, and so on) configured to sense indications (e.g., pressure, relative position, or combination of pressure and relative position) of the relative location (e.g., relative position with respect to the frame of relative depth with respect to field 16) of the shanks 22, the disks 46 and 48, the disks 62, or various other tools (not shown). A control unit (e.g., a control unit included in the controller 30) may receive signals from the various sensors associated with control device 70 that may indicate a particular orientation (e.g., depth) of shanks 22, disks 46 and 48, or disks 62. The control unit may then, using open loop, closed loop, proportional-integral-derivative "PID," or other control methodologies, determine an appropriate control signal to cause the cylinders 32, 44, and 60 to adjust, respectively, the orientation of the shanks 22, disks 46 and 48, and disks 62, as appropriate. In this way, for example, the combined system of controller 30, the sensors of control device 70 and the cylinders 32, 44, and 60 may move the shanks 22, disks 46 and 48, and disks 62 to, and maintain these devices at, any desired orientation.

One or more location-sensing devices may also be included on (or otherwise associated with) the implement 10. For example, a GPS device 72 may use GPS technology to detect the location of the implement 10 along the field 16 at regular intervals (e.g., during a tillage operation). The detected locations may then be communicated via various known means to the controller 30 (or another computing device) in order to inform various control strategies. The detected locations may additionally (or alternatively) be communicated to one or more remote systems. For example, GPS device 72 may wirelessly transmit location information for the implement 10 to a remote monitoring system for tracking of various aspects of the operation of the implement 10. As depicted in FIGS. 1-4, the GPS device 72 may be mounted to implement 10. In other examples, the GPS device 72 may be mounted in other ways, including to a vehicle (not shown) that tows the implement 10 along the field 16.

One or more camera assemblies may also be included on (or otherwise associated with) the implement 10. In some examples, such as those shown in FIGS. 4A and 4B, rearward camera assembly 74 may be mounted to the implement 10 (or otherwise positioned) in order to capture images of an area 76 behind the implement 10 (i.e., "rearward images"). Forward camera assembly 78 may additionally (or alternatively) be mounted to the implement 10 (or otherwise positioned) in order to capture images of an area 80 forward of the implement 10 (i.e., "forward" images). The camera assemblies 74 and 78 may be in electronic (or other) communication with the controller 30 (or other devices) and may include various numbers of cameras of various types. For example, one or both of the assemblies 74 and 78 may include a camera to capture images in the visible light spectrum or an infrared camera to capture infrared images. As another example, one or both of the assemblies 74 and 78 may include a grayscale camera to capture grayscale images. As another example, one or both of the assemblies 74 and 78 may include a stereo camera assembly capable of capturing stereo images. For instance, one or both of the assemblies 74 and 78 may include a stereo camera with two or more lenses and image sensors, or multiple cameras arranged to capture stereoscopic images of the areas 76 and 80.

Images may be captured by camera assemblies 74 and 78 according to various timings or other considerations. For example, the respective assemblies 74 and 78 may capture images continuously as implement 10 executes a tillage (or other) operation on the field 16. An embedded control system (not shown) for each assembly 74 and 78 may cause the respective assemblies 74 and 78 to capture images of the areas 76 and 80, respectively, at regular time intervals as implement 10 executes a tillage (or other) operation on the field 16.

The timing of image capture by rearward camera assembly 74 may be offset from the timing of image capture by forward camera assembly 78 such that the portion of the field 16 within the image area 76 when the rearward camera assembly 74 captures an image substantially overlaps with the portion of the field 16 that was within the image area 80 when the forward camera assembly 78 captured a prior image. As such, for example, the relative timing of image capture for the two assemblies 74 and 78 may be varied by a control system (e.g., controller 30) based upon the ground speed of implement 10. This way, the images can be compared to identify the effect of the tillage operation.

Figure 4A:
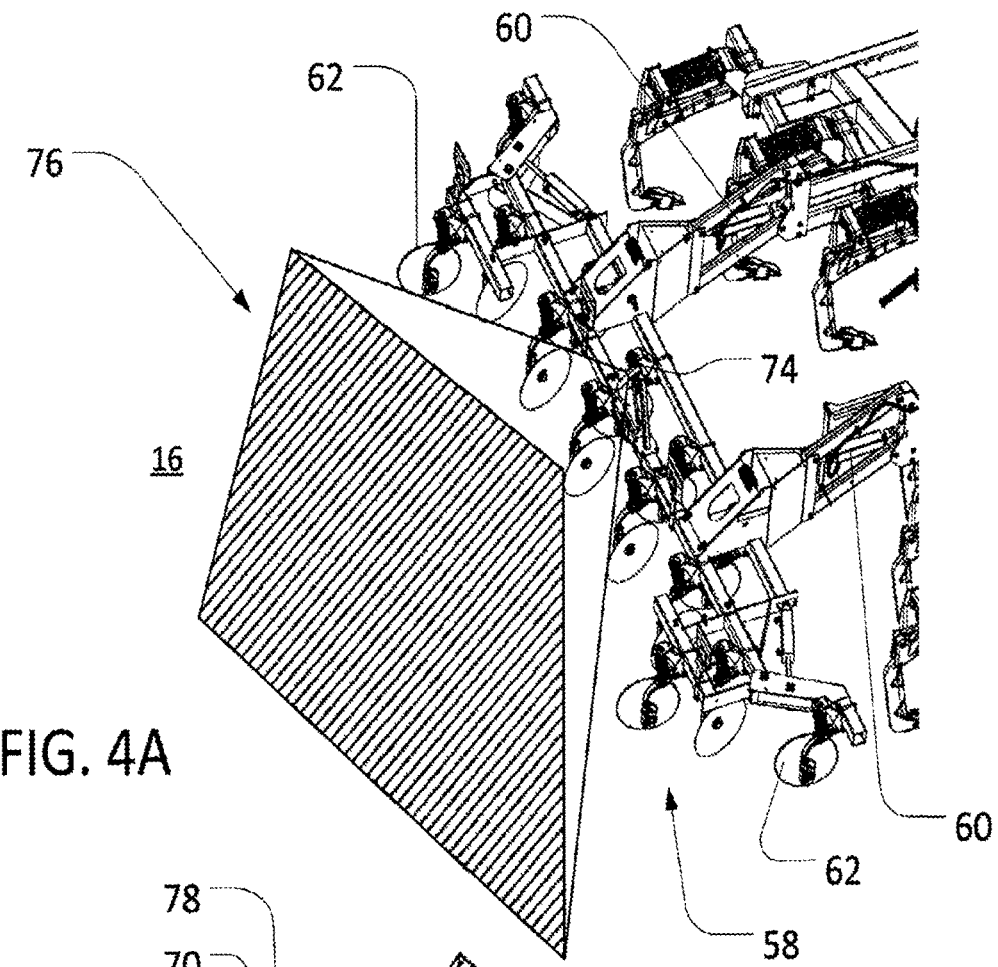
FIGS. 4A and 4B are partial perspective views of the example tillage implement of FIG. 1, showing, respectively, rearward and forward image areas.
Figure 4B:
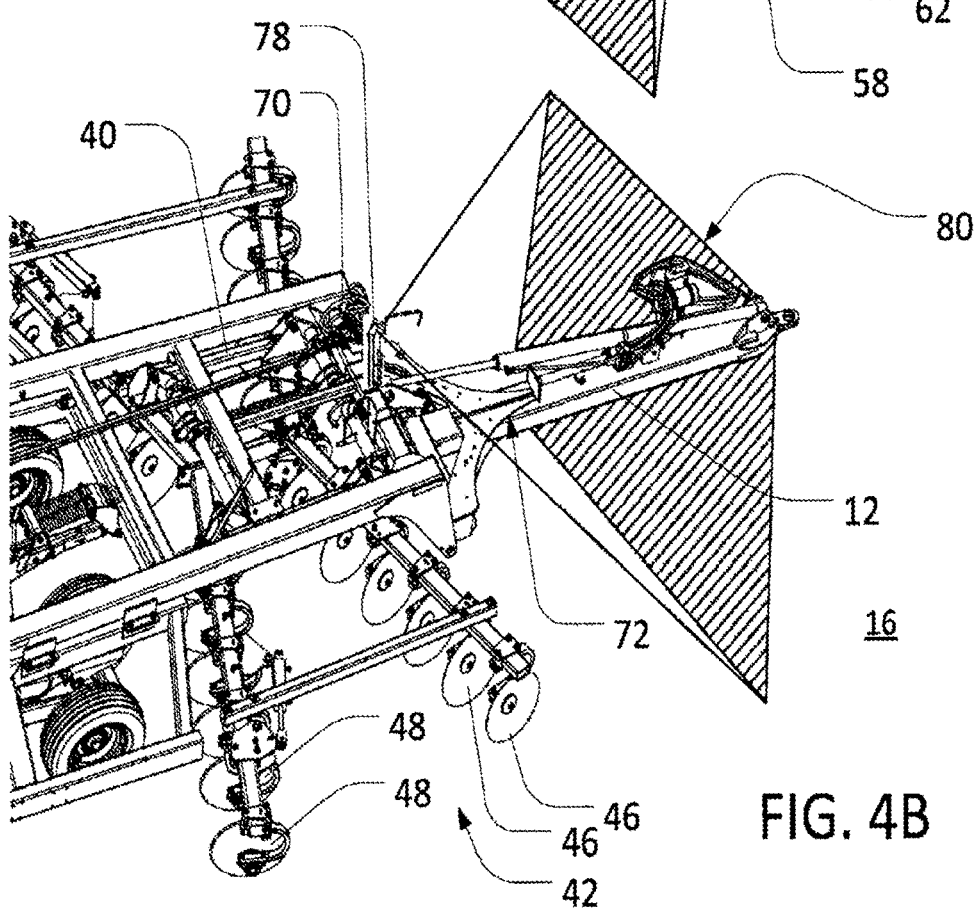

It will be understood that the image capture areas 76 and 80 of FIGS. 4A and 4B are presented as example image capture areas only, and that images may additionally (or alternatively) be captured of different areas of the field 16. Likewise, the mounting locations of the forward and rearward camera assemblies 78 and 74 are presented as examples only, and the camera assemblies 78 and 74 (or various other camera assemblies) may be mounted at various other locations. In certain examples, one or more camera assemblies may be mounted to a vehicle (not shown) that is towing the implement 10, or at various other locations.

As the relevant operation (e.g., a tillage operation) is executed, one or more camera assemblies may capture one or more images of an area of the field. The captured images may include images of an area that is currently forward of the relevant implement (i.e., forward images) and may include images of an area that is currently rearward of the relevant implement (i.e., rearward images). In certain examples, only forward images may be captured, only rearward images may be captured, or both forward and rearward images and may be captured. Various images and may be captured continuously, at pre-determined times, in response to particular events (e.g., the implement passing a marker on a field, entering a particular field region, or undergoing any variety of transient event), or at pre-determined intervals (e.g., every 3 seconds).

With respect to the implement 10, for example, the rearward camera assembly 74 may capture one or more rearward images of rearward image area 76 and the forward camera assembly 78 may capture one or more forward images of forward image area 80. The various forward images and rearward images may be captured continuously (e.g., as a video stream), at predetermined intervals, or based upon other criteria.

In certain implementations, the timing of the capture of forward images and rearward images may be arranged so that at least one captured forward image and at least one captured rearward image include substantially similar (e.g., substantially overlapping) views of the field 16. For example, where implement 10 is moving with a known speed and direction while executing a tillage operation, the area of the field 16 falling within the forward image area 80 at a particular time may fall within the rearward image area 76 a known amount of time later. Accordingly, where both forward and rearward images are acquired non-continuously, it may be possible for controller 30 to control the timing of the capture of the images, respectively, by camera assemblies 78 and 74 such that the two assemblies 78 and 74 each capture images of substantially the same portion of field 16. For example, if the implement 10 is being towed at a speed of 4 m/s and there are 2 meters separating the two image areas 76 and 80, the controller 30 may direct rearward camera assembly 74 to capture images with an offset of 0.5 seconds from the capture of corresponding images by forward camera 78.

Similarly, if images are captured continuously by the two camera assemblies 74 and 78, corresponding frames from the two assemblies 74 and 78 (i.e., frames representing images of the same portion of the field 16) may be determined based on the amount of time the implement 10 requires to travel the distance between the forward and rearward image areas 80 and 76. For example, if the implement 10 is being towed at a speed of 4 m/s and there are 2 meters separating the two image areas 76 and 80, determine that an image frame captured by the rearward camera assembly 74 may include a view of a similar area of the field 16 as an image frame captured by the forward camera assembly 0.5 seconds earlier in time.

In another example, a control system may have access to the dimensions of the implement and the locations of the camera assemblies 74 and 78 and the locations of the fields of view of the camera assemblies. In that way, based on the location of the implement 10, and as that location changes, the control system can determine when a rearward image is of the same portion of the field as a previously captured forward image. Thus, the two images can be correlated with one another based on a location where they were taken instead of, or in addition to, the time offset between the images and the speed and heading of the implement.

Because the captured images are to be utilized, at least in part, to assess residue coverage and, potentially, to corresponding control of various operations (as described in greater detail below), it may be useful for the images to include views of areas of the field 16 that are relatively nearby the relevant implement. Accordingly, as noted above, the view of a rearward camera assembly may be generally directed toward a rearward image area that is relatively close to the rearmost active portion of the relevant implement (e.g., an area immediately behind the rearmost tool or component that may affect residue coverage). Similarly, the view of a forward camera assembly may be generally directed toward a forward image area that is relatively close to the most forward active portion of the relevant implement (e.g., an area immediately ahead of the most forward tool or component that may affect residue coverage). Previous attempts at residue monitoring took the entire residue metric of area 76 and compared it to the entire residue metric of area 80. This form of the residue monitoring effectively took an average of the area (e.g., area 76 or 80) and ignored any lateral variance of residue distribution. As shown, in FIGS. 5A and 5B the areas 76 and 80 have been subdivided laterally (although not limited to the external division) to address the problems of uniformity and to better monitor the operation of implement 10. For example, to monitor the operation and effectiveness of individual shanks or discs of implement 10.

Figure 5A:
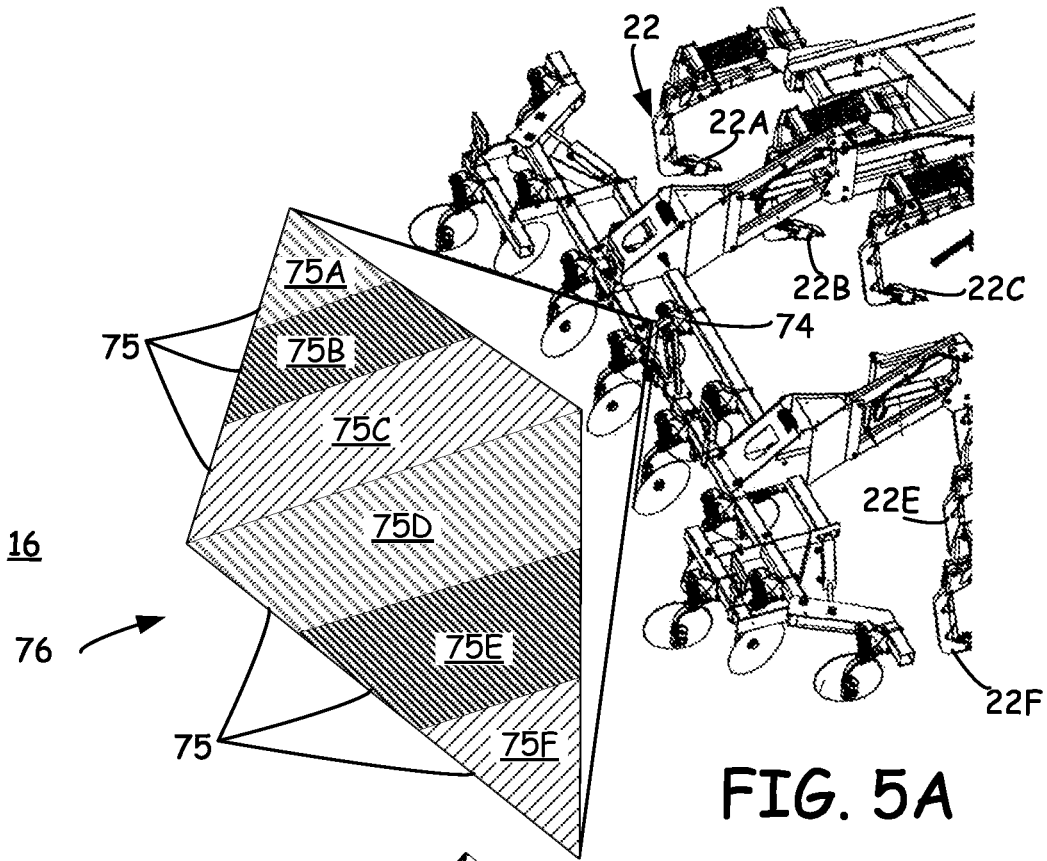
FIGS. 5A and 5B are partial perspective views of the example tillage implement of FIG. 1, showing, respectively, a plurality of rearward and forward zones.

FIG. 5A is a rear perspective view showing a rear portion of implement 10. As shown in FIG. 5A, the sensed area 76 of ground 16 that is rearward of implement 10 is divided into a plurality of rearward zones 75. Rearward zones 75 are segmentations of the sensed area 76. Rearward zones 75 can each have their own sensor 74 or can share one or more sensors 74 (as shown, all rearward zones 75 share the same sensor 74. Each rearward zone 75 can be treated as area 76 has been described above. For example, an amount of residue in each rearward zone 75 can be calculated by analyzing data from sensor 74. For example, using image data and an edge finding algorithm to calculate residue coverage. As shown, there are six rearward zone 75, however, in other examples, there may be a different number of rearward zones 75. In FIG. 5A the six rearward zone 75, for example, align each with a given shank 22 (e.g., there are six rearward zone 75 each that align with a shank 22 in a direction of travel). Aligning rearward zones 75 with a specific ground engaging element of implement 10 may allow characterization of the performance of the given ground engaging element based on the residue value calculated for the given rearward zone 75. For example, assume rearward zone 75A aligns with shank 22A. If the amount of residue in rearward zone 75A changes while the residue metric of rearward zone 75B remains unchanged, it may indicate that there is a problem with shank 22A. For example, shank 22A may be clogged with residue and is thus affecting uniformity across area 76 whereas if all rearward zones 75 change at the same time it can be inferred there is not a problem with shank 22A, but rather implement 10 has reached the end of the field, for example.

In other examples area 76 can be segmented into a different number of rearward zones 75 in a different way as well. For example, there may be a different number of rearward zones 75 that each correspond to one of discs 46, 48 and/or 62. In some examples, there may be overlapping rearward zones 75 that correlate to both shanks 22 and discs 46, 48 and/or 62. This way several different metrics can be balanced against one another to determine if it is a specific shank 22 or a specific disc 46, 48 or 62 that is causing the undesired outcome.

For instance, a lateral area may be divided into six equal zones ("shank zones") corresponding to a set of shanks, while also being divided into 18 equal zones ("disk zones") corresponding to a set of disks. In this example, one of the shank zones may be experiencing a large change in residue coverage which can indicate a plugged shank. However, this shank zone also corresponds with three disk zones, so it is important to check if these disk zones are affected equally. If it is the case that the three corresponding disk zones are affected equally, then the problem is likely with the shank. For example, if the shank is plugged then the corresponding shank zone and its three overlapping disk zones will likely have residue metrics that change simultaneously and equally. However, if it is the case that one or more of the overlapping disk zones is affected disproportionately then the problem is likely with one of the disks (and not with the shank). For example, if one of the disks is mis-angled then it may be removing a disproportionate amount of residue from its disk zone and placing the residue into an adjacent disk zone. Thus, misalignment, damages, tools, and other problems can be identified. A system that only has one zone or large zones, may not be able to correctly identify such problems.

Figure 5B:
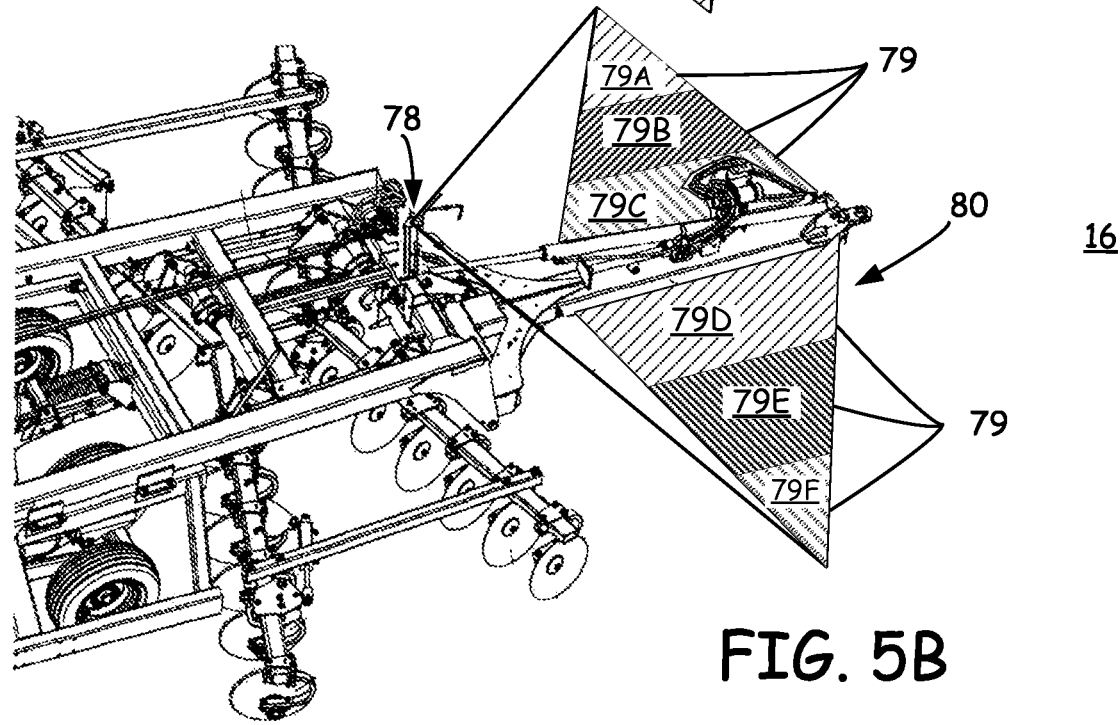

FIG. 5B is a rearward perspective view showing a front portion of implement 10. As shown, sensor 78 is monitoring area 80 of ground 16. Sensor 78 can sense and generate a signal indicative of the amount of residue at given portions of area 80. As shown, area 80 is divided into several forward zones 79. Forward zones 79 represent a portion of ground 16 and a sub portion of area 80. As shown, there are six forward zones 79, however, in other examples there may be a different number of forward zones 79. Also, forward zones 79 can be shaped in other ways as well and they are not necessarily limited to the shapes as shown. Sensor 78, as shown, detects data across all forward zones 79. In other examples, there may be a different number of sensors 78 that detect data across forward zones 79. For example, the detecting range of multiple sensors 78 could overlap to provide multiple data sets corresponding to a single zone 79. The number of forward zones 79 can correspond to the number of rearward zones 75. This way, a before and after tilling operation difference can be sensed. For instance, the sensed residue of a forward zones 79 will be in an initial state and the sensed residue in the corresponding rearward zone 75 will be the final state after an operation has been completed on the ground.

Figure 6:
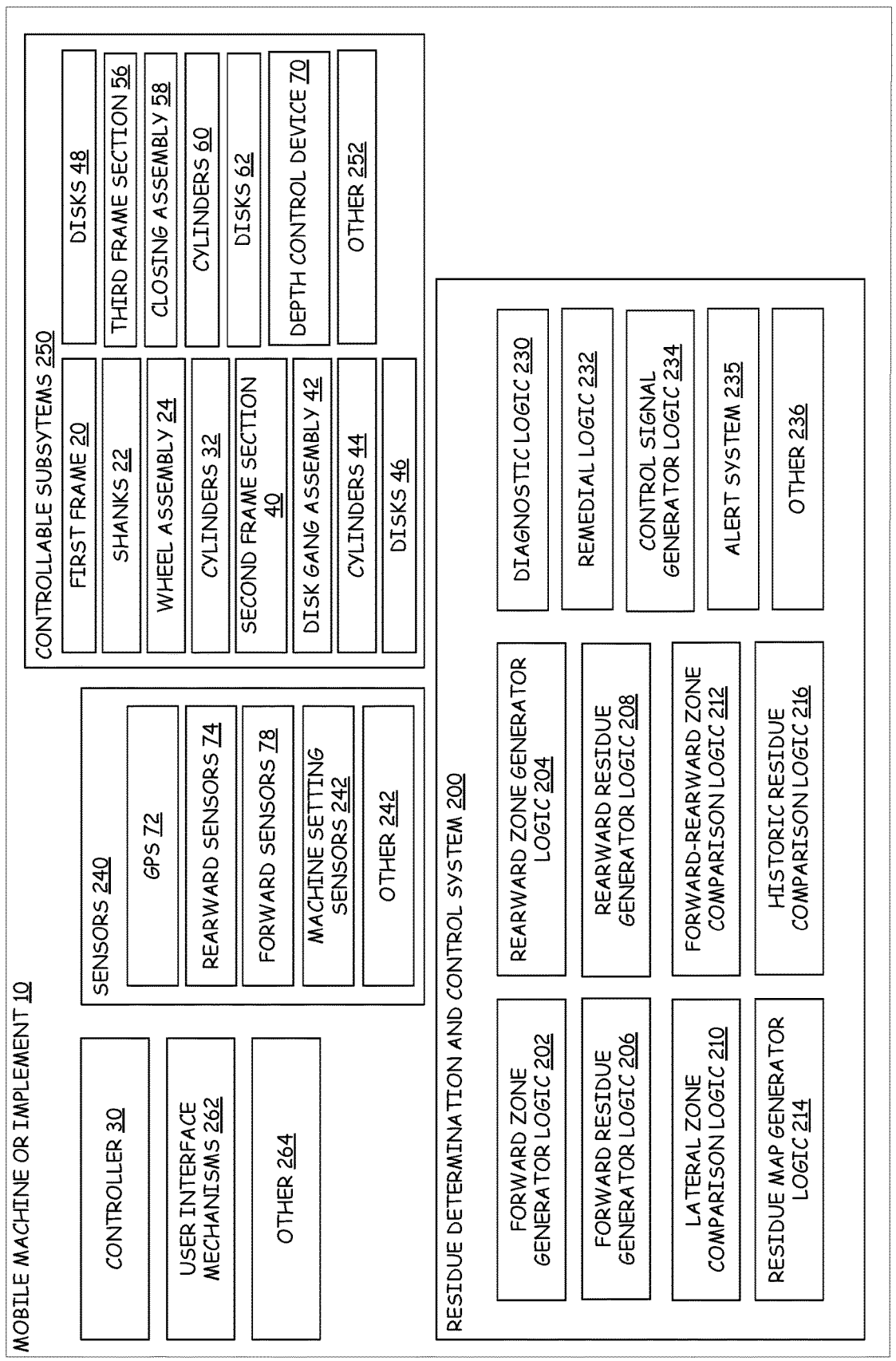
FIG. 6 is a block diagram showing an example tillage implement.

FIG. 6 is a block diagram showing one example of implement 10. As shown, implement 10 includes controller 30, user interface mechanisms 262, sensors 240, controllable subsystems 250, residue determination control system 200 and can include other items as well, as indicated by block 264.

Sensors 240 illustratively include GPS 72, rearward sensor 74, forward sensor 78, machine setting sensors 242 and can include other items as well, as indicated by block 244. Sensors 240, as shown, are located on implement 10. However, one or more sensors 240 can be located remotely from implement 10. For example, they can be located located on the vehicle towing implement 10, or a drone/UAV/aerial vehicle, or a fixed-ground location, or ground vehicle, etc.

GPS sensor 72 can detect a position of implement 10 and generate a sensor signal indicative of the sensed position. For example, GPS 72 can generate a sensor signal indicative of the GPS coordinates that correspond to the location of implement 10. GPS 72 can, of course, be replaced by a different type of location sensor as well.

Rearward sensors 74 are mounted at a position where the ground rearward of implement 10 is visible. Rearward sensors 74 can be any one of the aforementioned sensors 74. For example, an infrared camera, stereo camera, moisture sensor, hardness sensor, etc.

Forward sensors 78 are mounted at a position where they can sense the ground forward of implement 10 in a direction of operational travel. Forward sensors 78 can be any of the aforementioned sensors 78, such as an infrared camera, stereo camera, moisture sensor, hardness sensor, etc. Forward sensor 78 are able to generate a sensor signal indicative of the amount of residue on the ground.

Machine setting sensors 242 can detect various aspects of implement 10. For example, machine setting sensors 242 can include a speedometer that is indicative of the speed that implement 10 is currently traveling. As another example, machine setting sensors 242 can include an odometer that keep track keeps track of the distance machine 10 has traveled or is traveling. As another example, machine setting sensors 242 can include sensors that detect the angles of various controllable subsystems 250 (e.g. discs 46, 48 and 62). As another example, machine setting sensors 242 can include sensors that are able to detect the height of controllable subsystems 250 (e.g. a depth of shank 22 relative to the ground).

Controllable subsystems 250 include various components described above with respect to FIGS. 1-3. For example, they can include shanks 22 which are controlled by cylinders 32 to adjust vertically relative to ground 16. As another example, discs 42, 46, 48 and 62 are controlled by cylinders 44, 60 to adjust vertically with respect to ground 16 or wheel assembly 24. Controllable subsystems 250 are not limited to those described above and can conclude other items as well as indicated by block 252.

Residue determination control system 200 determines an amount of residue in each zone, forward and rearward of implement 10 and controls operation of implement 10 to improve the effectiveness of implement 10 (for example, to increase residue uniformity across a field). Residue determination and control system 200 includes forward zone generator logic 202, rearward zone generator logic 204, forward residue generator logic 206, rearward residue generator logic 208, lateral zone comparison logic 210, forward-rearward zone comparison logic 212, residue map generator logic 214, historic residue comparison logic 216, diagnostic logic 230, remedial logic 232, and control signal generator logic 234. Residue determination control system 200 can include other items as well, as indicated by block 236. The logic components of residue determination and control system 200 can be executed by controller 30 or some other processor discussed below.

Forward zone generator logic 202 identifies or defines (e.g., generates) the different forward zones 79. Forward zone generator logic 202 can generate these zones in a variety of different ways. For example, forward zone generator logic 202 can generate the zones according to various controllable subsystems 250 of implement 10. For instance, each forward zone 79 generated by forward zone generator logic 202 can align with a specific subsystem 250 (e.g., each forward zone 79 is generated for, and aligned with, each shank 22).

Forward zone generator logic 202 can generate the different forward zones 79 based on specific aspects of the field 16. For example, the forward zones 79 can be as wide as the anticipated planted rows of field 16 (as residue may accumulate at similar given intervals that correspond with the width between rows). Other aspects of field 16 can include the historic variations of field 16 that should be monitored. For example, if field 16 historically has had substantially uniform residue coverage, forward zones 79 may be larger as there is a larger historic likelihood that uniformity will be maintained across field 16.

Forward zone generator logic 202 can also generate the number and size of forward zones 79 manually through operator control the user interface mechanisms 262. For example, an operator can enter in a specific, number, width and depth of zones to be monitored.

Rearward zone generator logic 204 identifies or defines (e.g., generates) the plurality of rearward zones 75. Rearward zone generator logic 204 can generate rearward zone 75 in similar ways as forward zone generator logic 202 generates forward zones 79. For example, rearward zone generator logic 204 can generate rearward zones 75 so that they correspond to one or more of the various controllable subsystems 250 (e.g. a rearward zone 75 that corresponds to an area of ground that was affected by an operation of a given shank 22). Rearward zone generator logic 204 can also create a separate rearward zone 75 that corresponds with a corresponding forward zone 79. For instance, the forward zone 79 will correspond to an area of field 16 that will later correspond with a rearward zone 75 as implement 10 moves through field 16. This way, an effect of the operation of implement 10 on field 16 at the specific zone can be determined.

Forward residue generator logic 206 receives a sensor signal from forward sensors 78 and generates a residue metric indicative of the amount of residue in a portion of the area sensed by forward sensor 78. Forward residue generator logic 206 can analyze the data received from forward sensor 78 and generate a metric indicative of the amount of residue in forward area 80. Forward residue generator logic 206 can also use sensor data from sensor 78 to determine the amount of residue in each individual forward zone 79. The residue metric can be in percent residue coverage, volume of residue, weight of residue, etc.

Rearward residue generator logic 208 utilizes similar processes as forward residue generator logic 206 to determine the amount of residue in rearward area 76. Rearward residue generator logic 208 can similarly also determine the amount of residue in each individual rearward zone 75.

Lateral zone comparison logic 210 compares the amount of residue in lateral zones. For example, lateral zone comparison logic 210 compares the amount of residue in one rearward zone 75 to another rearward zone 75 and generates a comparison metric indicative of that comparison. For instance, lateral zone comparison logic 210 generates a comparison metric indicating that one rearward zone 75 (e.g., zone 75A) has a significant deviation in residue from the other rearward zones 75B-F. This comparison can be indicative of a malfunctioning controllable subsystem 250 and may result in a remedial operation that increases uniformity across rearward area 76.

Forward-rearward zone comparison logic 212 compares one or more forward zones 79 to one or more rearward zones 75 and generates a comparison metric indicative of the comparison. For example, forward-rearward zone comparison logic 212 compares forward zone 79A to rearward zone 75A and generates a comparison metric that can be used to determine the effectiveness of an operation by implement 10.

Specifically, the comparison may indicate whether the controllable subsystem 208 that aligns with the forward and rearward zone 75A and 79A is performing adequately. The pre-existing condition of the area treated (e.g. the amount of residue before the tillage operation—as indicated by an image of zone 79A) can be considered in evaluating the result of the operation (as indicated by an image of zone 75A). For example, if there is a substantial amount of residue in the forward zone 79A, then this can be considered so that it will be expected that there will be more residue in the rear corresponding rearward zone 75A.

Residue map generator logic 214 receives residue metric values from forward residue generator logic 206 and rearward residue generator logic 208 as well as a sensor signal from position sensors 72 and generates a map of residue metrics. For example, residue map generator logic 214 takes a residue metric for specific rearward zone 75 and stores it in connection with its location (since there is a known spatial relationship between position sensor 72 and field of view of sensor 74, the position of rearward zones 75 may be calculated based on the known position). A map generated by residue map generator logic 214 can be used by other machines as well. For example, if a large amount of residue is in one area, another machine may utilize the map to re-till this area or retrieve this residue as it may cause problems when planting.

Historic residue comparison logic 216 compares the instantaneous values of a residue metric to historic residue metric values (e.g. a value stored in a map previously created by residue map generator logic 214). For example, if a specific area is known to have high residue metrics, that can be considered when calculating future residue metrics in that area or when controlling implement 10 in that area. In one example, an operator can adjust the sensitivity in collecting and generating of the historic residue metric values. For instance, in a field where residue coverage is highly variable, an operator may desire store more fine grained values (e.g., values for smaller sections of the field), because a field-wide average may not be as useful in a field that varies widely or frequently.

Diagnostic logic 230 receives value from other logic components of residue determination control system 200 to diagnose a specific problem. For example, if lateral zone comparison logic 210 determines that a specific zone has a significantly lower amount of residue in it, it can be assumed that the controllable subsystem 250 that operated in that zone has a plug. A significant change in a residue metric can be defined by a change that exceeds a threshold or tolerance value. A plug can mean that residue is accumulating on the specific ground engaging element rather than being turned or moved by the ground engaging element. As another example, diagnostic logic 230 can receive metrics from both lateral zone comparison logic 210 and forward-rearward zone comparison logic 212 and determine that one of the ground engaging elements is at an improper angle. In this case, for instance, two laterally adjacent rearward zones may have significant differences from each other while their corresponding forward zones do not share this significant difference.

As another example, diagnostic logic 230 can receive metrics from forward residue generator logic 206 and lateral zone comparison logic 210 and determine that the residue distribution in front of the implement is not within an acceptable level of uniformity. An acceptable level of uniformity or threshold uniformity may be a default value or may be set by a user using one or more user interface mechanisms 262. For example, a slider on a user interface of a display can be utilized to set the uniformity threshold.

Diagnostic logic 230 may also provide data to residue map generator logic 214 as abnormalities are detected. Residue map generator logic 214 can store the location of the abnormality in conjunction with the location that the abnormality was detected.

Remedial logic 232 receives an indication from diagnostic logic 230 that is indicative of an abnormality. Remedial logic 232 then determines a remedial action to correct the abnormality. In one example, remedial logic 232 can provide inputs to control signal generator logic 234 to generate a control signal that automatically implements a change in one of the controllable subsystems 260 to remedy the identified problem. For instance, if a plugged shank is the abnormality, then control signal generator logic 234 may raise the shank until the plug is removed at which point normal operation may begin again. In another example, if a lack of uniformity in front of the implement is the abnormality, then control signal generator logic 234 may angle various disks to more equally distribute the residue and increase uniformity.

In an open control loop example, remedial logic 232 can utilize an alert system 235 to generate an alert to the user to remedy an abnormality. For example, alert system 235 might generate an alert identifying a plug on shank #1. An alert may be audible, visual, haptic, etc.

User interface mechanisms 262 can include a variety of different mechanisms through which an operator can control implement 10. For example, user interface mechanisms 262 can include mechanical components such as, a steering wheel, levers, pedals, buttons, switches, etc. As other examples, user interface mechanisms 262 can include electronic user interface components such as, touch screens, displays, buttons, sliders, etc. For example, a user can adjust a slider on a user interface of a touch screen to adjust the sensitivity with which a closed-loop control system makes adjustments in response to a detected abnormality. In one example, a user interface mechanism 262 displays the residue metrics for each zone.

Figure 7A:
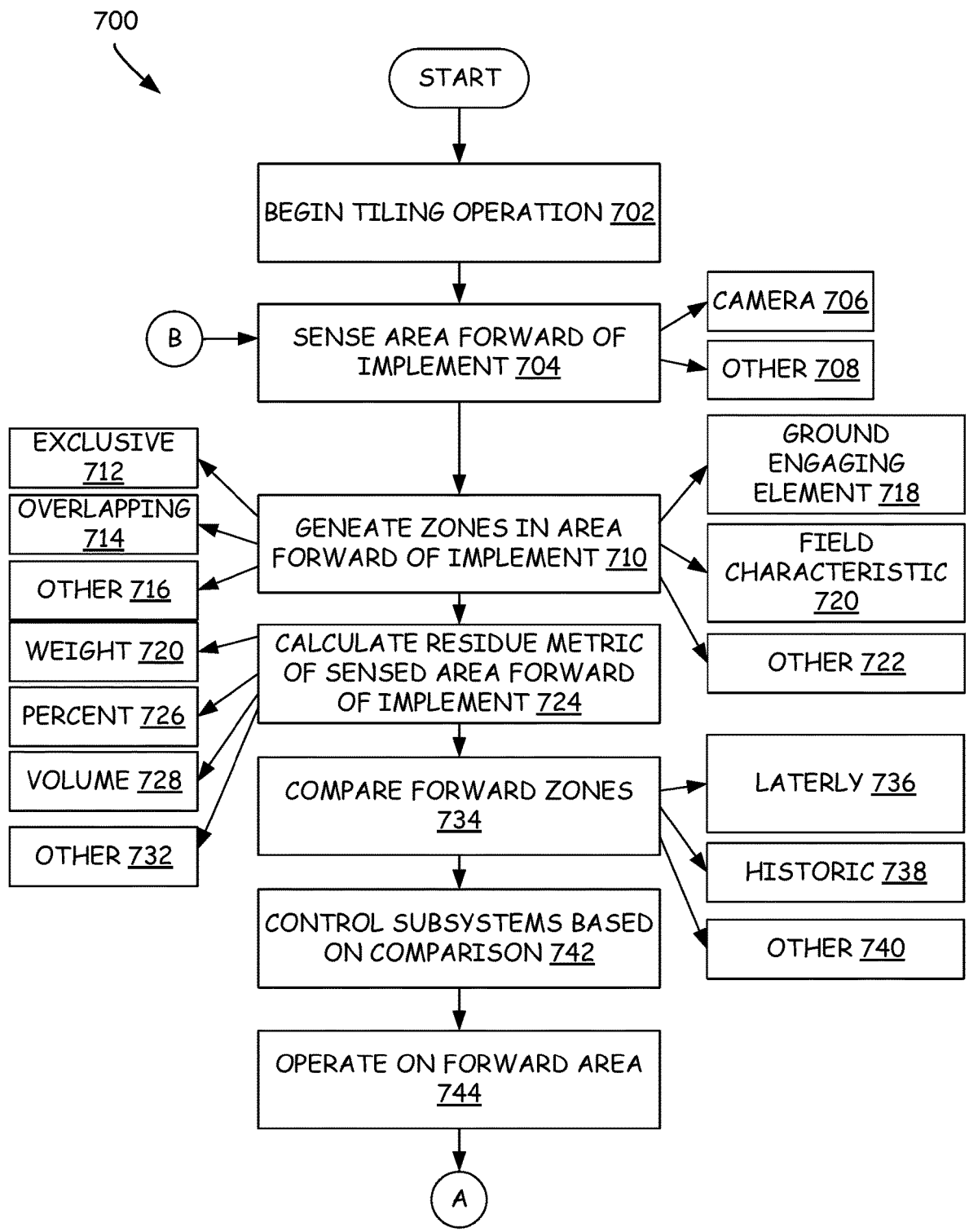
FIGS. 7A-7B (collectively referred to herein as FIG. 7) illustrate a flow diagram showing an example operation of the tillage implement of FIG. 1.
Figure 7B:
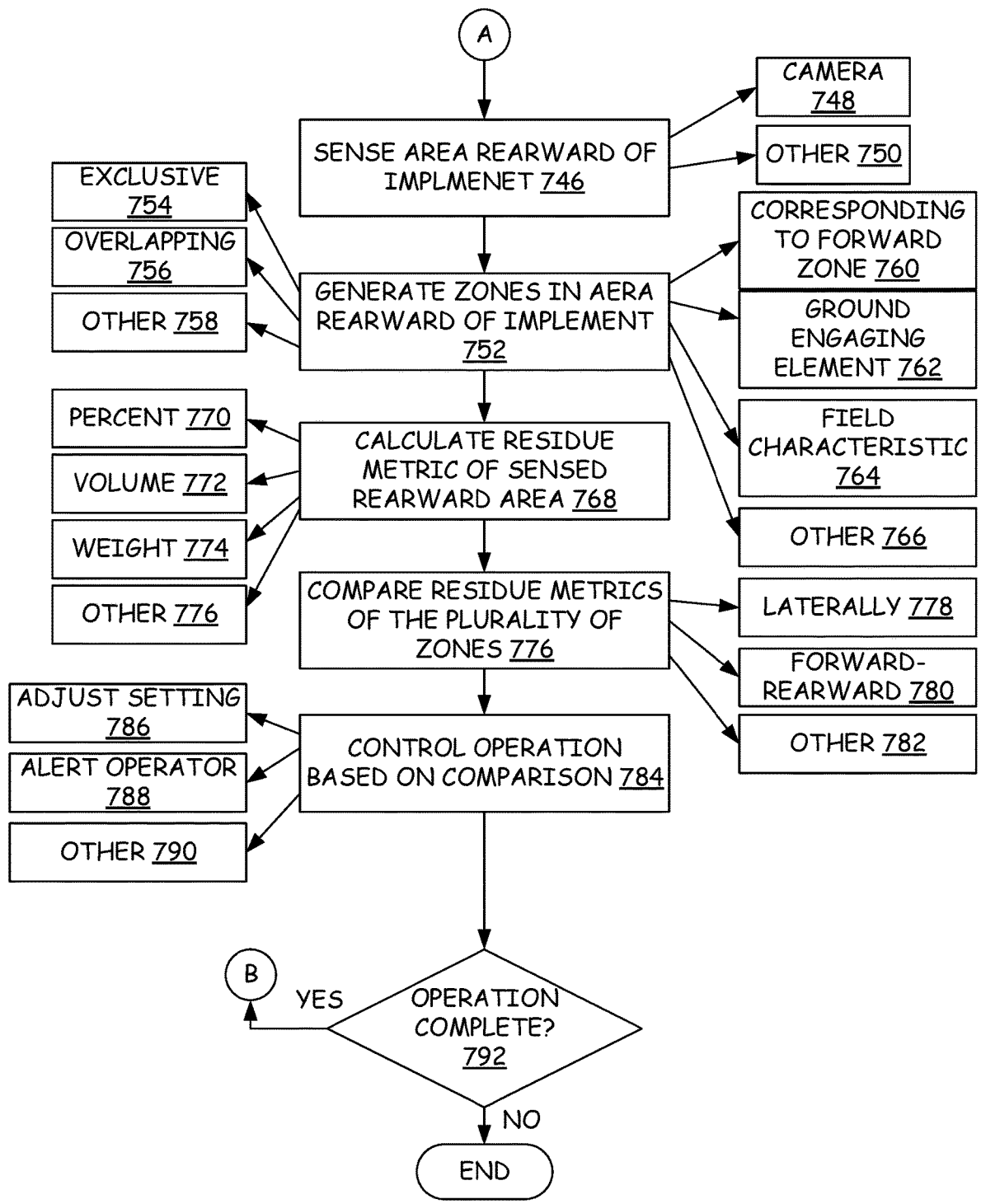

FIGS. 7A-7B (collectively referred to herein as FIG. 7) illustrate a flow diagram showing an example operation of implement 10. Operation 700 begins at block 702 where a tilling operation of implement 10 begins. For example, a tractor begins towing implement 10 across a field with one or more ground engaging elements engaging the field (e.g. for example, field 16).

Operation 700 proceeds at block 704 where sensor 78 senses an area forward of implement 10. For example, sensor 78 can sense area 80 of field 16. Sensor 78 can be a camera, as indicated by block 706. Sensor 78 can be a different type of sensor as well, as indicated by block 708.

Operation 700 proceeds at block 710 where forward zone generator logic 202 generates a plurality of forward zones 79 that represent portions of forward area 80. The generated zones can be exclusive as indicated by block 712, meaning that the zones do not overlap with one another. The zones can be overlapping as indicated by block 714, meaning that one or more forward zones represent portions of field 16 that are also represented, at least in part, by another forward zone. Zones may be arranged in other ways as well, as indicated by block 716.

Forward zone generator logic 202 can define or generate (e.g., their arrangement, shape, size, etc.) the zones based on a variety of different factors, as indicated by block 718-722. As indicated by block 718, the zones can be defined based on alignment with one or more ground engaging elements. For example, a zone may be specifically defined to align with the effective width of one or more grounding engaging elements (e.g., an effective width of the zone is defined to correspond to the width of an area effected by the operation of the ground engaging element). As indicated by block 720, the zone may be defined based on a specific field characteristic. For example, if the field is historically known to have uniform residue distribution (e.g., after harvest or after another pre-tilling operation), the zones can be larger. Having a large zone can lower sensitivity to uniformity (because a residue metric for a zone is effectively an average over the area covered by the zone), while having smaller zones can increase uniformity across a field. It can also increase complexity of operation and processing power needed to analyze the tilling operation. By knowing the field is likely to be uniform, larger zones can be used to save processing power and reduce complexity while, probability-wise, having little effect on the end uniformity of the field. As indicated by block 722, the zones can be generated based on other factors as well.

Operation 700 proceeds at block 724 where forward residue generator logic 206 calculates a residue metric of the area sensed forward of implement 10. For example, the metric can be represented by a percent coverage as indicated by block 726. In another example, the residue metric can represent a volume of residue, as indicated by block 728. In another example, the residue metric can be representative of the residue weight, as indicated by block 720. As indicated by block 732, the residue metric can be indicative of another metric as well.

Operation 700 proceeds at block 734 where the residue metrics of the sensed zones are compared. For example, the zones can be compared laterally, across the width of the sensed area, for uniformity. This way if one zone has more residue than another zone an operation can be performed to equalize the residue amongst these two zones to increase uniformity across field 16. The zones can also be compared against their historic values as well, as indicated by block 738. For example, if historically during operation in field 16, a residue metric for a given zone remains substantially constant, but at some time during operation, the zone residue metric for that given zone significantly changes, there may be an actionable problem (e.g., such as a plug, or a damaged or misaligned disk). The zones can be compared in other ways as well, as indicated by block 740. For example, the zones can be compared both laterally and historically. For example, assume that the residue metrics for all zones are historically substantially constant. Then, assume that the one zone has a residue metric that shows a significant deviation from its historical consistency. It can be assumed that this zone has a problem. However, if the other zones also had a significant deviation, then this can indicate, that, rather than having a problem, a field boundary may have been encountered. These types of comparisons and analyses are examples only.

Operation 700 proceeds at block 742 where controller 30 controls a subsystem based on the comparison from block 734. For example, a comparison that reveals a lack of uniformity across zones of area 80 may result in a specific action by one or more ground engaging elements to increase uniformity after the tilling operation (e.g., in area 80 of field 16).

Operation 700 proceeds at block 744 where implement 10 operates on the forward area on the area 80 of ground 16.

Operation 700 proceeds at block 746 where the area 76 rearward of implement 10 is sensed by sensor 74. As noted above, by correlating the sensing of area 76 to the sensing of area 80, area 76 may represent a portion of field 16 that overlaps with the portion of field 16 which was previously represented by area 80. Sensor 74 can be a camera as indicated by 748 or can be some other type of sensor as indicated by block 750.

Operation 700 proceeds at block 752 where rearward zone generator logic 204 generates rearward zones 75 that represent portions of area 76. Rearward zone 75 can be exclusive meaning that the zones 75 do not overlap with one another, as indicated by block 754. Zones 75 can be overlapping, as indicated by block 756, meaning that a zone 75 represents a portion of field 16 that is also represented, at least in part, by another zone 75. Zones can be defined in other ways as well, as indicated by block 758.

Rearward zones 75 can be defined or generated (e.g. shaped, located, sized, arranged, etc.) based on a variety of different factors as indicated by blocks 760-766. As indicated by block 760, the zones can be defined corresponding to a generated forward zone. For example, rearward zone generator logic 204 will generate a rearward zone 75 such that it will overlap with a portion of field 16 that was previously represented by a forward zone 79 earlier in operation of implement 10.

As indicated by block 762, the rearward zone 75 can be defined based on the location of a ground engaging element. For example, a rearward zone 75 can represent a portion of field 16 that aligns with, and has the width of an area of ground effect by the operation of, one or more grounding engaging elements. For instance, assume a shank 22 is a few inches wide but the effect its operation has on the earth is a foot wide, in this case, the rearward zone 75 could be sized to the width of the effect of the shank (e.g. a foot), to the size of the shank (e.g. a few inches), or otherwise.

As indicated by block 764, rearward zone 75 can be defined based on some characteristic of field 16. For example, crops are often planted in rows. The distance between rows and type of crop often influences the distribution and density of residue in the field. Using one of these characteristics of the crop or field can be useful in calculating residue zone sizes. For example, a crop that produces a large amount of residue may have greater demands in ensuring residue uniformity across field 16. As indicated by block 766, other factors can be used as well to define one or more rearward zones 75.

Operation 700 proceeds at block 768 where rearward residue generator logic 208 calculates residue metrics for rearward area 76 and the individual rearward zones 75. The residue metric can be indicative of the percent coverage, as indicated by block 770. For example, residue may cover 60% of the ground surface in a given zone. The residue metric can also be indicative of the volumetric measure of residue, as indicated by block 772. For example, there may be 10 cubic feet of residue in a given zone. As indicated by block 774, the residue metric can be indicative of the weight of residue. For example, there may be 20 pounds of residue in a given zone. As indicated by block 776, the residue metric can be indicative of other residue measures as well. It should be noted that when referring to residue metrics, they can either be direct measures (e.g., measuring residue volume with a volume sensor) or can be estimated measures (e.g., estimating volume based on sensor data from a camera).

Operation 700 proceeds at block 776 where one or more of the pluralities of forward zones 79 and/or rearward zones 75 are compared using one or more methods. As indicated by block 778, zones may be compared laterally by lateral zone comparison logic 210. Lateral comparisons involve comparing one or more rearward zones to one another, or comparing one or more forward zones to one another. A lateral comparison may be indicative of the difference between lateral residue metrics. For example, one rearward zone 75 may have 50% coverage while another rearward zone 75 has a 10% coverage, in this example, the difference is 40% coverage.

The plurality of zones can be compared on a forward to rearward basis by forward-rearward zone comparison logic 212, as indicated by block 780. A forward to rearward zone comparison involves comparing one or more forward zones 79 to one or more rearward zones 75. This comparison can be useful in determining if a prescribed implement 10 (or specific component of implement 10) operation has accomplished its objective. For example, forward zone 79A may have less residue coverage than forward zone 79B so a prescribed action may be to turn one or more discs of implement 10 so that it distributes some residue from the ground represented by zone 79B to the ground represented by zone 79A. Then forward-rearward zone comparison logic 212 can compare zone 75A to zone 79A and zone 75B to zone 79B to determine whether the prescribed angling of the disc worked to create better uniformity between the portions of field 16 represented by zones 75A and 75B. This is an example only and there may be other zone comparisons made in block 776 as well, as indicated by block 782.

Operation 700 proceeds at block 784 where the operation of implement 10 is controlled based on the comparison from block 776. For instance, as indicated by block 786, one or more machine settings may be adjusted. As an example, a ground engaging element can be raised or lowered, or its angle can be changed, or it can be moved laterally.

In another example, the operator is alerted of a problem, as indicated by block 788. For example, diagnostic logic 730 can detect, based on the comparison in block 776, that there is a plug in one or more ground engaging elements. The operation can be controlled to address the plug in other ways as well as indicated by block 790. Operation 700 continues at block 792 where is determined if there are any more operations to complete. If not, operation 700 ends. If there are more operations to complete operation 700 continues again at block 704.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
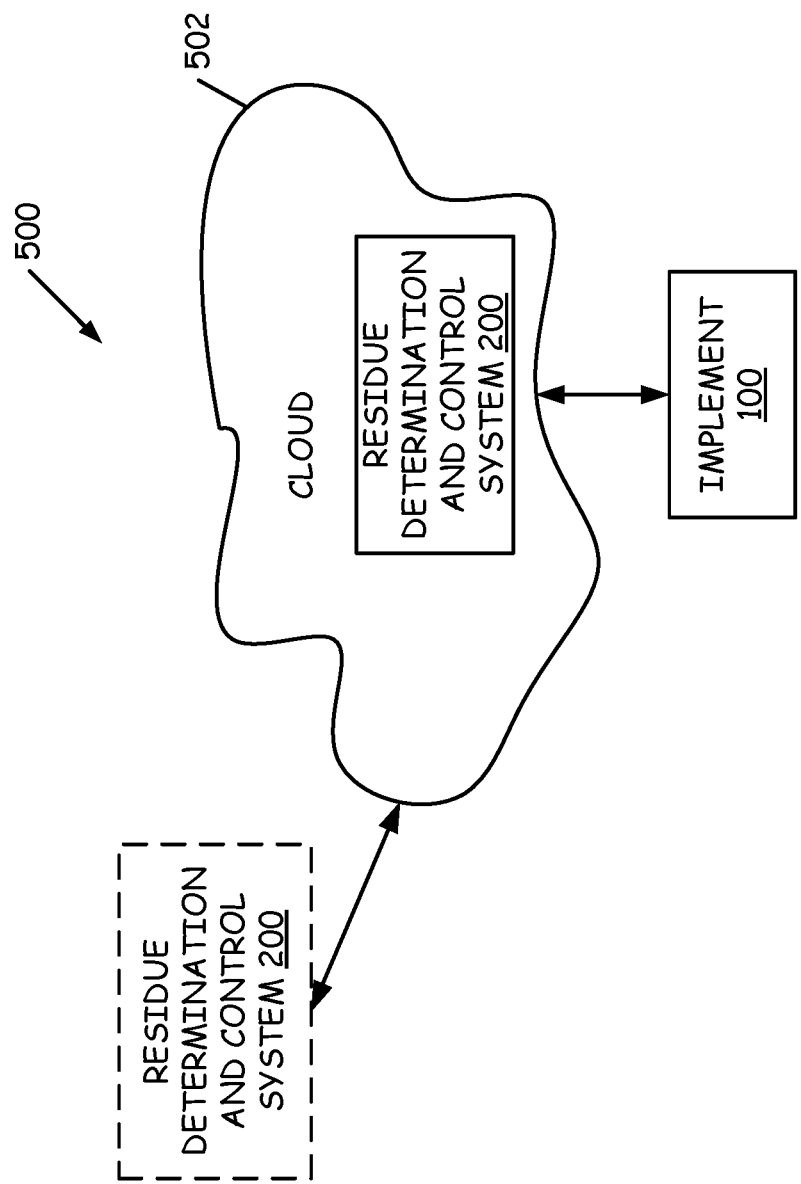
FIG. 8 is a block diagram of one example of the architecture illustrated in FIG. 6, deployed in a remote server architecture.

FIG. 8 is a block diagram of implement 10, shown in FIG. 6, except that it is deployed in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 6 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 8, some items are similar to those shown in FIG. 6 and they are similarly numbered. FIG. 8 specifically shows that residue determination and control system 200 can be located at a remote server location 502. The information can be provided to remote server location 502 by implement 10 in any of a wide variety of different ways. Therefore, machines can access those systems through remote server location 502.

FIG. 8 also depicts another example of a remote server architecture. FIG. 8 shows that it is also contemplated that some elements of FIG. 6 are disposed at remote server location 502 while others are not. By way of example, residue determination and control system 200, or parts thereof, can be disposed at a location separate from location 502, and accessed through the remote server at location 502. In another example, residue determination and control system 200 can be disposed at a location separate from location 502, and accessed through the remote server at location 502. In another example, control system 200 can be disposed at a location separate from location 502, and accessed through the remote server at location 502. Regardless of where they are located, they can be accessed directly by implement to or user device, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the implement comes close to the fuel truck for fueling, the system automatically collects the information from the implement using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on implement 10 until the machine enters a covered location. The machine, itself, can then send the information to the main network.

It will also be noted that the elements of FIG. 6, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
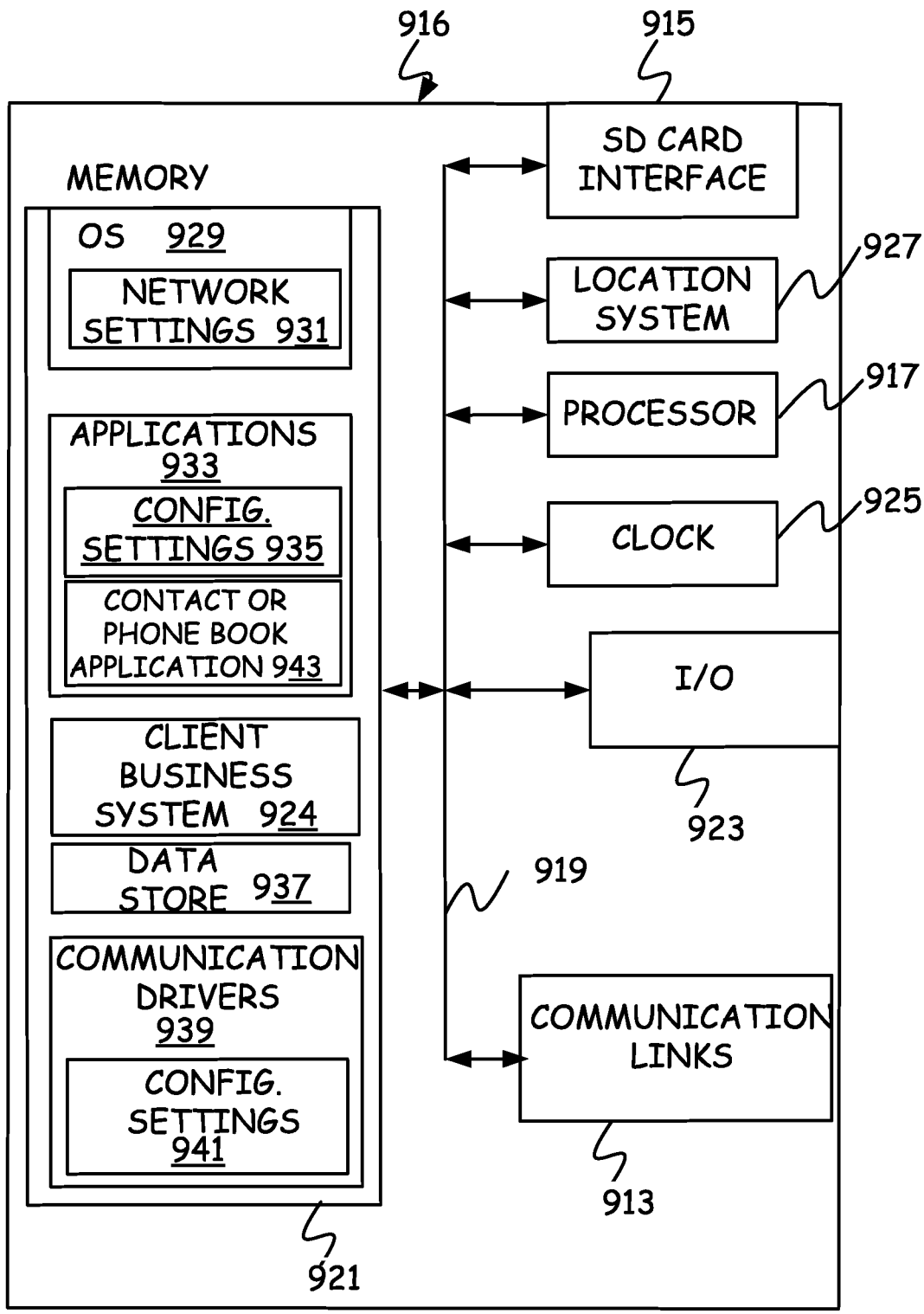
FIGS. 9-11 are examples of mobile devices that can be used in the architectures illustrated in the previous figures.
Figure 10:
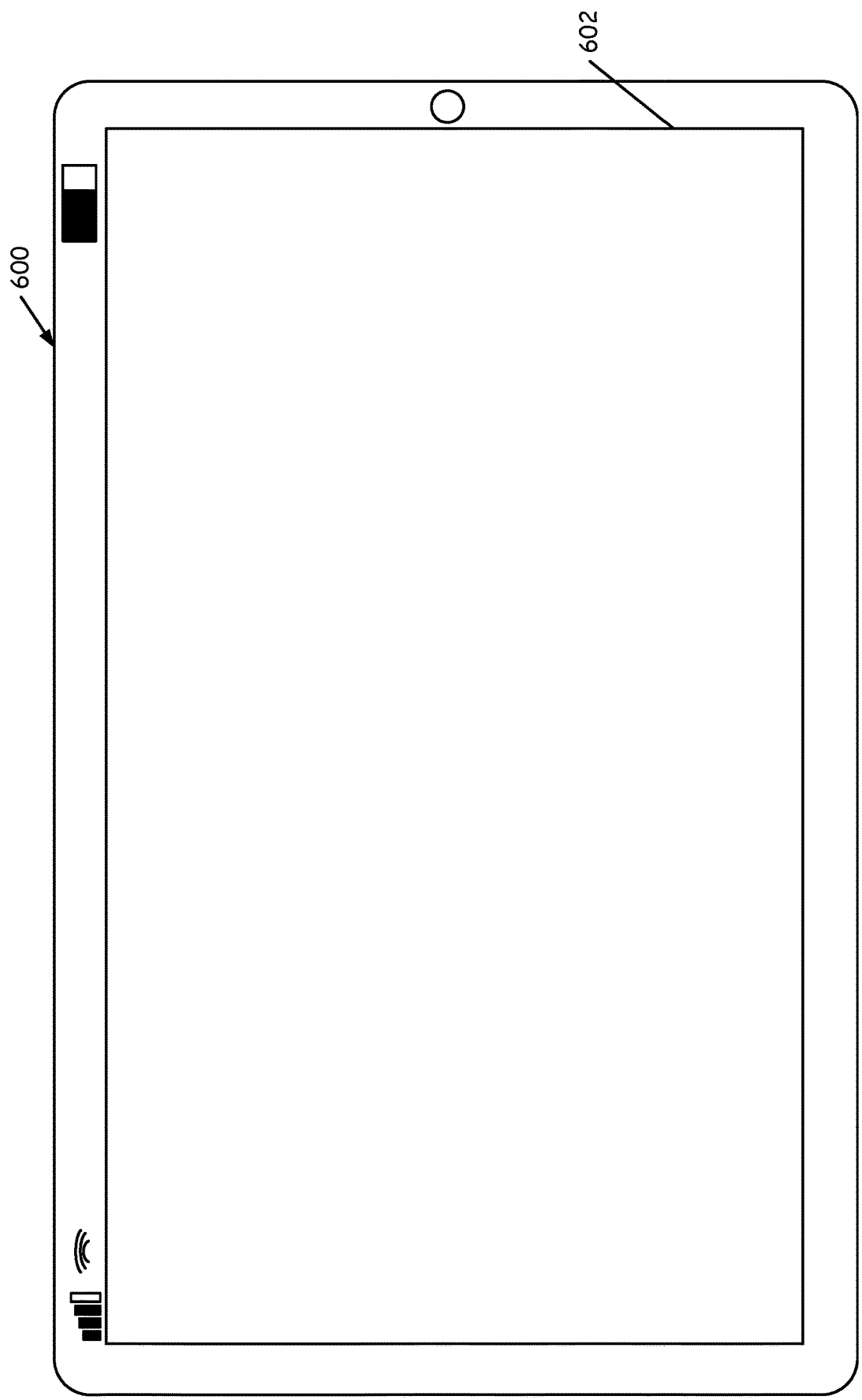
Figure 11:
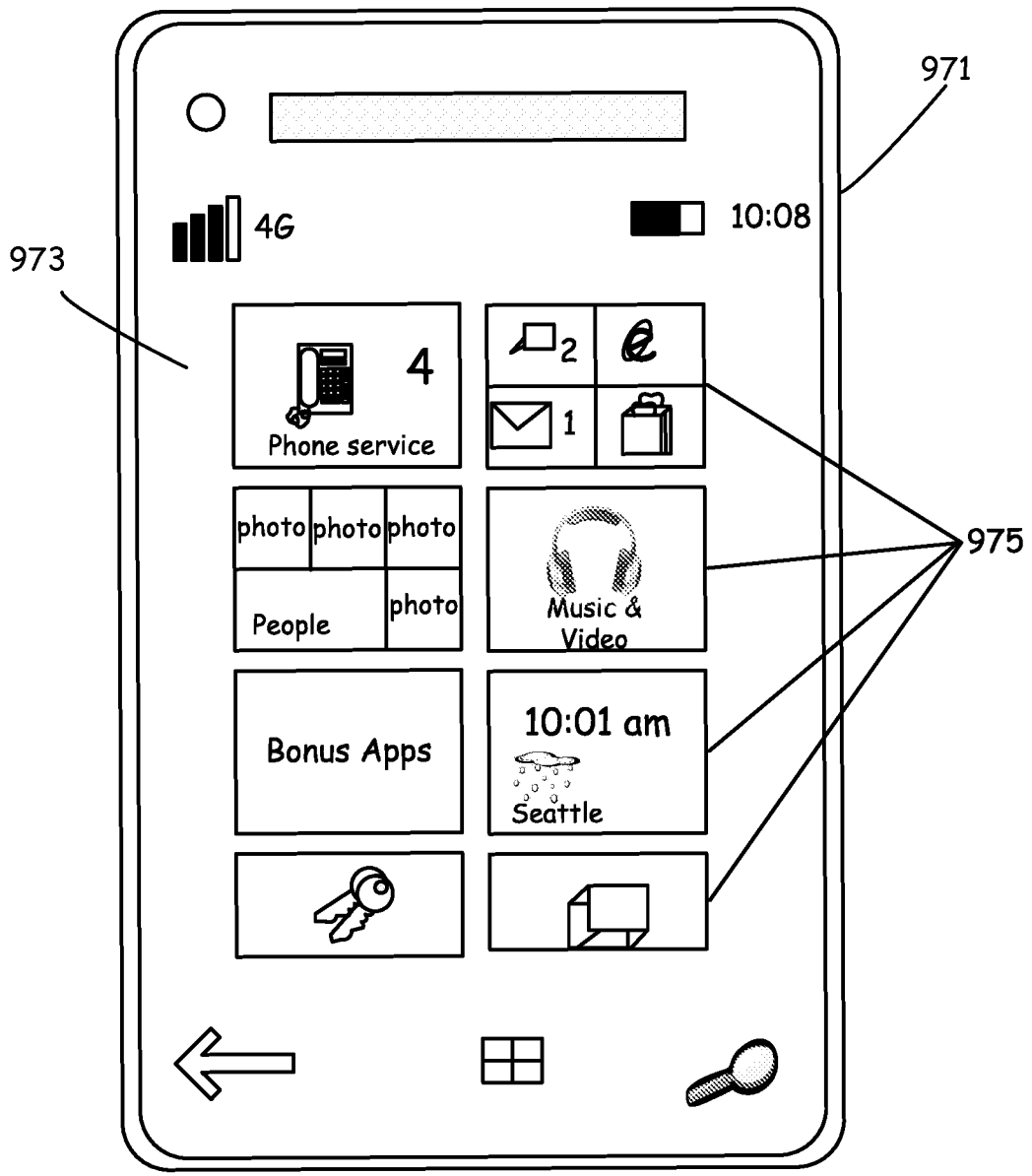

FIG. 9 is a simplified block diagram of one illustrative example of a handheld or mobile computing device that can be used as a user's or client's handheld devices 16, in which the present system (or parts of it) can be deployed. For instance, a mobile device can be deployed in the operator compartment of implement 10, or as user device 504 for use in generating, processing, or displaying the plant evaluation information. FIGS. 10-11 are examples of handheld or mobile devices.

FIG. 9 provides a general block diagram of the components of a client device 916 that can run some components shown in FIG. 6, that interacts with them, or both. In the device 916, a communications link 913 is provided that allows the handheld device to communicate with other computing devices and under some examples provides a channel for receiving information automatically, such as by scanning. Examples of communications link 913 include allowing communication though one or more communication protocols, such as wireless services used to provide cellular access to a network, as well as protocols that provide local wireless connections to networks.

In other examples, applications can be received on a removable Secure Digital (SD) card that is connected to an interface 915. Interface 915 and communication links 913 communicate with a processor 917 (which can also embody any processor or server from previous Figures) along a bus 919 that is also connected to memory 921 and input/output (I/O) components 923, as well as clock 925 and location system 927.

I/O components 923, in one example, are provided to facilitate input and output operations. I/O components 923 for various examples of the device 916 can include input components such as buttons, touch sensors, optical sensors, microphones, touch screens, proximity sensors, accelerometers, orientation sensors and output components such as a display device, a speaker, and or a printer port. Other I/O components 923 can be used as well.

Clock 925 illustratively comprises a real time clock component that outputs a time and date. It can also, illustratively, provide timing functions for processor 917.

Location system 927 illustratively includes a component that outputs a current geographical location of device 916. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 921 stores operating system 929, network settings 931, applications 393, application configuration settings 935, data store 937, communication drivers 939, and communication configuration settings 941. Memory 921 can include all types of tangible volatile and non-volatile computer-readable memory devices. It can also include computer storage media (described below). Memory 921 stores computer readable instructions that, when executed by processor 917, cause the processor to perform computer-implemented steps or functions according to the instructions. Processor 917 can be activated by other components to facilitate their functionality as well.

FIG. 10 shows one example in which device 16 is a tablet computer 600. In FIG. 10, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 971. Smart phone 971 has a touch sensitive display 973 that displays icons or tiles or other user input mechanisms 975. Mechanisms 975 can be used by a user to run applications, make calls, perform data transfer operations, etc. In general, smart phone 971 is built on a mobile operating system and offers more advanced computing capability and connectivity than a feature phone.

Note that other forms of the devices 16 are possible.

Figure 12:
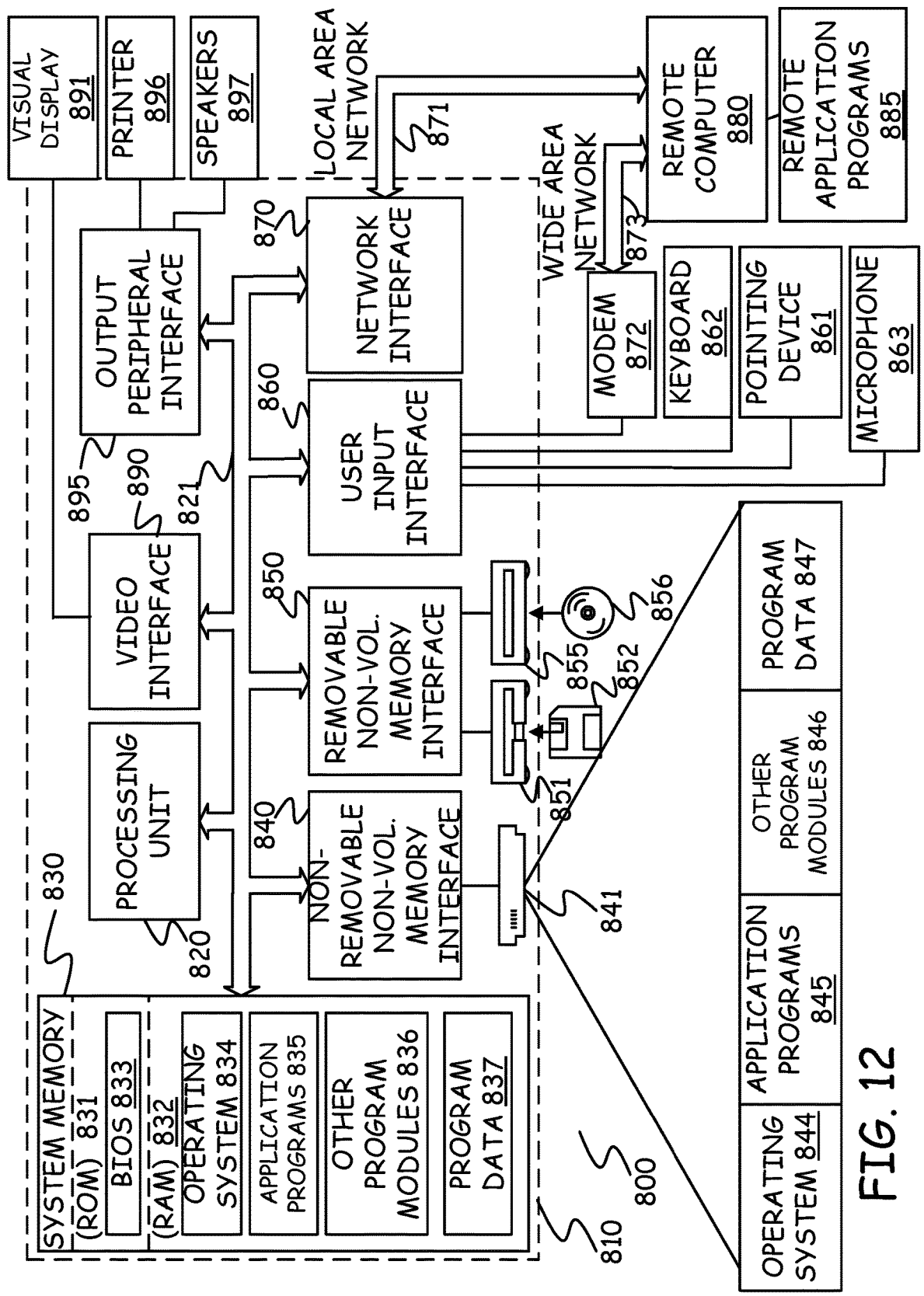
FIG. 12 is a block diagram of one example of a computing environment that can be used in the architectures shown in the previous figures.

FIG. 12 is one example of a computing environment in which elements of FIG. 6, or parts of it, (for example) can be deployed. With reference to FIG. 12, an example system for implementing some examples includes a general-purpose computing device in the form of a computer 810. Components of computer 810 may include, but are not limited to, a processing unit 820 (which can comprise processors or servers from any previous Figure), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 6 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random-access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural machine comprising:
 a set of ground engaging elements that perform a ground engaging operation as the agricultural machine travels in a travel direction;
 a controllable subsystem that controls the set of ground engaging elements to perform the ground engaging application;
 a rearward sensor mounted to the agricultural machine to sense an area of ground behind the agricultural machine, relative to the travel direction, and generate a rearward sensor signal;
 rearward zone generator logic that determines a first zone and a second zone, wherein the first zone and the second zone represent different portions of the area of ground behind the agricultural machine;
 rearward residue generator logic configured to receive the rearward sensor signal and determine a first residue metric indicative of the amount of residue in the first zone; and
 control logic that controls the controllable subsystem to so the set of ground engaging elements performs the ground engaging operation on the area of ground based on the first residue metric.

Example 2 is the agricultural machine of any or all previous examples, wherein the rearward residue generator logic is further configured to determine a second residue metric indicative of the amount of residue in the second zone and the control logic controls the controllable subsystem so the set of ground engaging elements perform the ground engaging operation based at least in part on the second residue metric.

Example 3 is the agricultural machine of any or all previous examples, further comprising lateral zone residue comparison logic that compares the first residue metric to the second residue metric and generates a rearward uniformity metric indicative of the comparison between the first residue metric and the second residue metric; and
 wherein the control logic is configured to control the controllable subsystem so the set of ground engaging elements perform the ground engaging operation based at least in part on the rearward uniformity metric.

Example 4 is the agricultural machine of any or all previous examples, wherein the control logic controls the controllable subsystem so the set of ground engaging elements perform the ground engaging operation to increase residue uniformity rearward of the agricultural machine.

Example 5 is the agricultural machine of any or all previous examples, further comprising:
 a forward sensor mounted to the agricultural machine to sense a forward area of ground in front of the agricultural machine, relative to the travel direction, and generate a forward sensor signal;
 forward zone generator logic that determines a third zone and a fourth zone, wherein the third zone and the fourth zone represent different portions of the area of ground in front of the agricultural machine, wherein the rearward zone generator logic and the forward zone generator logic are mounted relative to one another so the portion of the area of ground that is in the third zone when located in the forward area comprises at least a portion of the area of ground that is in the first zone when located rearward of the agricultural machine and the portion of the area of ground that is in the fourth zone when located in the forward area comprises at least a portion of the area of ground that is in the second zone when located rearward of the agricultural machine;
 forward residue generator logic configured to receive the forward sensor signal and determine a third residue metric indicative of the amount of residue in the third zone; and
 wherein the control logic controls the controllable subsystem so the set of ground engaging elements perform the ground engaging operation based at least in part on the third residue metric.

Example 6 is the agricultural machine of any or all previous examples, wherein the forward residue generator logic is further configured to determine a fourth residue metric indicative of the amount of residue in the fourth zone and the control logic controls controllable subsystems so the set of ground engaging elements perform the ground engaging operation based at least in part on the fourth residue metric.

Example 7 is the agricultural machine of any or all previous examples, further comprising:
 lateral zone residue comparison logic that compares the third residue metric to the fourth residue metric generates a forward uniformity metric; and
 wherein the control logic controls controllable subsystem so the set of ground-engaging elements perform the ground engaging operation based at least in part on the forward uniformity metric.

Example 8 is the agricultural machine of any or all previous examples, further comprising forward-rearward comparison logic that compares the first reside metric to the third residue metric and generates an operation effect metric; and
 wherein the control logic controls the controllable subsystem so the set of ground-engaging elements perform the ground engaging operation based at least in part on the operation effect metric.

Example 9 is the agricultural machine of any or all previous examples, further comprising:
 a location sensor configured to sense a location of the agricultural machine and generate a location signal indicative of the location of the agricultural machine; and
 residue map generator logic configured to receive the location signal and generate a map entry indicative of a location of the agricultural machine and the first residue metric.

Example 10 is the agricultural machine of any or all previous examples, further comprising:
 historic residue data generator logic configured to monitor and store, over time, the first residue metric and generates a historic residue metric; and
 historic residue comparison logic configured to compare a current first residue metric with the historic residue metric and generate a historic comparison metric indicative of the comparison; and
 wherein the control logic controls the controllable subsystem so the set of ground engaging elements perform the ground engaging operation based at least in part on the historic comparison metric.

Example 11 is the agricultural machine of any or all previous examples, further comprising:
diagnostic and alert logic configured to receive the first residue metric, determine an error and generate an alert to an operator that is indicative of the error.

Example 12 is the agricultural machine of any or all previous examples, further comprising:
a user interface mechanism operably coupled to the rearward zone generator logic, wherein actuation of the user interface mechanism changes the portions of the area of ground behind the agricultural machine represented by the first zone.

Example 13 is the agricultural machine of any or all previous examples, wherein the control logic controls the controllable subsystem to adjust the angle of one of the ground engaging elements.

Example 14 is the agricultural machine of any or all previous examples, wherein the control logic controls the controllable subsystem to adjust the depth of one of the ground engaging elements.

Example 15 is a method performed by an agricultural machine that performs a ground engaging operation when traveling in a travel direction, the method comprising:
generating with rearward zone generator logic, a first rearward zone signal that is indicative of a portion of ground rearward of the agriculture machine relative to the travel direction;
sensing, with a rearward sensor, an amount of reside in the first rearward zone;
generating, with the rearward sensor, a first sensor signal indicative of the amount of residue in the first rearward zone; and
receiving, with rearward residue generator logic, the first sensor signal and generating a first residue metric indicative of the amount of residue in the first rearward zone;
controlling a set of ground engaging elements, with control logic, to perform the ground engaging operation based on the first residue metric.

Example 16 is the method of any or all previous examples, further comprising:
generating with rearward zone generator logic, a second rearward zone that is indicative of a second portion of ground rearward of the agriculture machine relative to the travel direction;
sensing, with a rearward sensor, an amount of reside in the second rearward zone;
generating, with the rearward sensor, a second sensor signal indicative of the amount of residue in the second rearward zone;
receiving, with rearward residue generator logic, the second sensor signal and generating a second residue metric indicative of the amount of residue in the second rearward zone; and
wherein controlling the set of ground engaging elements with control logic is based at least in part on the second residue metric.

Example 17 is the method of any or all previous examples, further comprising:
determining, with lateral comparison logic, a difference between the first residue metric and the second residue metric;
generating, with lateral comparison logic, a difference metric indicative of the difference between the first residue metric and the second residue metric; and
wherein controlling the set of ground engaging elements with control logic is based at least in part on the difference metric.

Example 18 is the method of any or all previous examples, further comprising:
generating with forward zone generator logic, a first forward zone that is indicative of a first portion of ground forward of the agriculture machine;
sensing, with a forward sensor, an amount of reside in the first forward zone;
generating, with the forward sensor, a third sensor signal indicative of the amount of residue in the first forward zone;
receiving, with forward residue generator logic, the third sensor signal and generating a third residue metric indicative of the amount of residue in the first forward zone;
determining, with forward-rearward comparison logic, a difference between the first residue metric and the third residue metric;
generating, with the forward-rearward comparison logic, a difference metric indicative of the difference between the first residue metric and the third residue metric; and
wherein controlling the set of ground engaging elements with control logic is based at least in part on the difference metric.

Example 19 is the method of any or all previous examples, wherein controlling the set of ground engaging elements with control logic comprises:
generating a control signal indicative of an angle change of a ground engaging element; and
sending the control signal to an actuator of the ground engaging element.

Example 20 is an agricultural machine comprising:
a set of ground engaging elements;
a forward sensor that senses a forward area that is forward of the agricultural machine;
a rearward sensor that senses a rearward area that is rearward of the agricultural machine;
zone generator logic that generates a plurality of forward zones and a plurality of rearward zones, each forward zone corresponding to at least one rearward zone;
forward residue generator logic that receives a forward sensor signal from the forward sensor and determines an amount of residue in each of the plurality of forward zones based on the forward sensor signal and generates a plurality of forward residue metrics, each forward residue metric indicative of the amount of residue in one of the plurality of forward zones;
rearward residue generator logic that receives a rearward sensor signal from the rearward sensor and determines an amount of residue in each of the plurality of rearward zones based on the rearward sensor signal and generates a plurality of rearward residue metrics, each rearward residue metric indicative of the amount of residue in one of the plurality of rearward zones;
zone residue comparison logic that compares two or more zones from the plurality of rearward zones and the plurality of forward zones, and generates a comparison metric indicative of the comparison; and
control logic that controls at least one of the ground engaging elements in the set of ground engaging elements based on the comparison metric.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile agricultural machine comprising:
a set of ground engaging elements that perform a ground engaging operation as the agricultural machine travels in a travel direction across a field;
one or more controllable subsystems that control the set of ground engaging elements to perform the ground engaging operation;
one or more processors;
memory storing computer executable instructions that, when executed by the one or more processors, cause the one or more processors to perform steps comprising:
obtaining data relative to an area of ground of the field, around the mobile agricultural machine, relative to the travel direction
determining a that residue metric indicative of a first amount of residue in the area of ground of the field around the mobile agricultural machine based on the obtained data;
determining a second residue metric indicative of agricultural amount of residue in the area of ground of the field around the mobile agricultural machine based on the obtained data;
controlling the one or more controllable subsystems based, at least in part, on the first residue metric and the second residue metric.

2. The mobile agricultural machine of claim 1, wherein the area of ground of the field around the mobile agricultural machine is an area of ground of the field ahead of the mobile agricultural machine relative to the travel direction, the mobile agricultural machine further comprising a sensor mounted to the mobile agricultural machine and configured to sense the area of ground of the field ahead of the mobile agricultural machine, relative to the travel direction, and to generate a sensor signal, where the obtained data comprises the sensor signal.

3. The mobile agricultural machine of claim 2, wherein the sensor comprises a camera.

4. The mobile agricultural machine of claim 1, wherein the area of ground of the field around the mobile agricultural machine is an area of ground of the field ahead of the mobile agricultural machine relative to the travel direction and wherein the obtained data comprises a residue map of the field.

5. The mobile agricultural machine of claim 1, wherein the computer executable instructions, when executed by the one or more processors, further cause the one or more processors to perform steps comprising:
comparing the first residue metric and the second residue metric; and
generating a uniformity metric indicative of the comparison between the first residue metric and the second residue metric; and
wherein controlling the one or more controllable subsystems comprises controlling the one or more controllable subsystems based, at least in part, on the uniformity metric.

6. The mobile agricultural machine of claim 1, wherein the first residue metric comprises a first residue metric indicative of a first amount of residue in the area of ground of the field around the mobile agricultural machine when the area of ground of the field around the mobile agricultural machine is ahead of the mobile agricultural machine relative to the travel direction, and
wherein the second residue metric is indicative of a second amount of residue in the area of ground of the field around the mobile agricultural machine when the area of ground of the field around the mobile agricultural machine is behind the mobile agricultural machine relative to the travel direction.

7. The mobile agricultural machine of claim 6, the computer executable instructions, when executed by the one or more processors, further cause the one or more processors to perform a step comprising:
comparing the first residue metric and the second residue metric; and
generating an operation effect metric based on the comparison of the first residue metric and the second residue metric; and
wherein controlling the controllable subsystem comprises controlling the controllable subsystem based, at least in part, on the operation effect metric.

8. The mobile agricultural machine of claim 1, further comprising:
a location sensor configured to sense a location of the agricultural machine and generate a location signal indicative of the location of the agricultural machine; and
wherein the computer executable instructions, when executed by the one or more processors, further cause the one or more processors to perform steps comprising:
receiving the location signal; and
generating a map entry indicative of a location of the agricultural machine and at least one of the first residue metric and the second residue metric.

9. The agricultural machine of claim 1, wherein the computer executable instructions, when executed by the one or more processors, further cause the one or more processors to perform steps comprising:
monitoring and storing over time, the first residue metric;
monitoring and storing over time, the second residue metric;
generating a first historic residue metric based on the first residue metric stored over time;
generating a second historic residue metric based on the second residue metric stored over time;
comparing a current first residue metric and the first historic residue metric; and
comparing a current second residue metric and the second historic residue metric;
generating a first historic comparison metric indicative of the comparison of the current first residue metric and the second historic residue metric;
generating a second historic comparison metric indicative of the comparison of the current second residue metric and the second historic residue metric;
wherein controlling the one or more controllable subsystems comprises controlling the one or more controllable subsystems based, at least in part, on the first historic comparison metric and the second historic comparison metric.

10. The mobile agricultural machine of claim 1, wherein the computer executable instructions, when executed by the one or more processors, further cause the one or more processors to perform steps comprising:
receiving the first residue metric and the second residue metric;
determining an error based on the first residue metric and the second residue metric; and
generating an alert indicative of the error to an operator.

11. The mobile agricultural machine of claim 10, wherein the error comprises plugging of one or more of the ground engaging elements of the set of ground engaging elements.

12. The mobile agricultural machine of claim 1, wherein controlling the one or more controllable subsystems comprises controlling the one or more controllable subsystems to adjust an angle of one or more of the ground engaging elements of the set of ground engaging elements.

13. The agricultural machine of claim 1, wherein controlling the one or more controllable subsystem comprises controlling the one or more controllable subsystem to adjust a depth of one or more of the ground engaging elements of the set of ground engaging elements.

14. A method performed by an agricultural machine that performs a ground engaging operation when traveling in a travel direction, the method comprising:
   generating a first forward zone signal that is indicative of, as a first forward zone, a first portion of ground ahead of the agriculture machine relative to the travel direction;
   generating a second forward zone signal that is indicative of as a second forward zone, a second portion of ground ahead of the agriculture machine relative to the travel direction;
   sensing, with one or more forward sensor, an amount of residue in the first forward zone and an amount of residue in the second forward zone;
   generating, with the one or more forward sensors, sensor data indicative of the amount of residue in the first forward zone and the amount of residue in the second forward zone; and
   receiving the sensor data and generating based on the sensor data, both a first residue metric indicative of the amount of residue in the first forward zone and a second residue metric indicative of the amount of residue in the second forward zone; and
   controlling a set of ground engaging elements to perform the ground engaging operation based, at least in part, on the first residue metric and the second residue metric.

15. The method of claim 14, further comprising:
   comparing the first residue metric and the second residue metric; and
   generating a forward uniformity metric bused on the comparison of the first residue metric and the second residue metric; and
   wherein controlling the set of ground engaging elements comprises controlling the set of ground engaging elements based, at least in part, on the forward uniformity metric.

16. The method of claim 14, wherein controlling the set of ground engaging elements comprises controlling the set of ground engaging elements to adjust one or more of:
   an angle of a ground engaging element of the set of ground engaging elements; and
   a depth of a ground engaging element of the set of ground engaging elements.

17. An agricultural machine comprising:
   a set of ground engaging elements configured to perform a ground engaging operation as the agricultural machine travels in a travel direction;
   a controllable subsystem configured to control the set of ground engaging elements to perform the ground engaging operation;
   a forward sensor configured to sense an area of ground ahead of the agricultural machine, relative to the travel direction, and to generate a forward sensor signal;
   one or more processors; and
   memory storing computer executable instructions that, when executed by the one or more processors, cause the one or more processors to perform steps comprising:
      determining a first zone and a second zone, wherein the first zone and the second zone represent different portions of the area of ground ahead of the agricultural machine;
      determining a first residue metric indicative of an amount of residue in the first zone based on the forward sensor signal; and
      controlling the controllable subsystem to control the set of ground engaging elements to perform the ground engaging operation based at least in part on the first residue metric.

18. The agricultural machine of claim 17, wherein the computer executable instructions, when executed by the one or more processors, further cause the one or more processors to perform a step comprising determining a second residue metric indicative of an amount of residue in the second zone based on the forward sensor signal, and
   wherein controlling the controlling the controllable subsystem comprises controlling the controllable subsystem to control the set of ground engaging elements to perform the ground engaging operation based, at least in part on the second residue metric.

19. The mobile agricultural machine of claim 4, wherein the residue map is generated prior to a current operation of the mobile agricultural machine at the field.

20. The mobile agricultural machine of claim 1, wherein the area of ground of the field around the mobile agricultural machine includes a first sub-area and a second sub-area, wherein the first residue metric is indicative of an amount of residue in the first sub-area, and wherein the second residue metric is indicative of an amount of residue in the second sub-area.

* * * * *